(12) United States Patent
Ravichandran et al.

(10) Patent No.: US 12,325,310 B2
(45) Date of Patent: Jun. 10, 2025

(54) CLUNK AND SHUFFLE MANAGEMENT IN MULTI-MOTOR, MULTI-AXLE ELECTRIFIED DRIVETRAINS

(71) Applicant: Ford Global Technologies, LLC, Dearborn, MI (US)

(72) Inventors: Maruthi Ravichandran, Dearborn, MI (US); Bhavesh Paradkar, Canton, MI (US); Rajit Johri, San Francisco, CA (US); Naginder Gogna, Northville, MI (US); Mary Catherine Farmer, Plymouth, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 17/812,372

(22) Filed: Jul. 13, 2022

(65) Prior Publication Data

US 2023/0241983 A1 Aug. 3, 2023

(30) Foreign Application Priority Data

Jan. 28, 2022 (IN) .............................. 202241004895

(51) Int. Cl.
*B60L 15/32* (2006.01)
*B60L 15/20* (2006.01)
(Continued)

(52) U.S. Cl.
CPC ........... *B60L 15/32* (2013.01); *B60L 15/2036* (2013.01); *B60W 30/18036* (2013.01);
(Continued)

(58) Field of Classification Search
CPC ................. B60L 15/32; B60L 15/2036; B60L 2240/423; B60L 2260/28; B60L 2240/14; B60L 2240/421; B60L 2240/463; B60L 2250/18; B60L 2260/26; B60L 15/2045; B60L 15/20; B60W 30/18036;
(Continued)

(56) References Cited

U.S. PATENT DOCUMENTS 6,266,597 B1 7/2001 Russell et al.
9,091,219 B2 * 7/2015 Kar ....................... F02D 41/107
(Continued)

OTHER PUBLICATIONS

P. Reddy, M. Shahbakhti, M. Ravichandran and J. Doering, "Real-Time Estimation of Backlash Size in Automotive Drivetrains," in IEEE/ASME Transactions on Mechatronics, vol. 27, No. 5, pp. 3362-3372, Oct. 2022. Date of original publication Jan. 11, 2022, doi: 10.1109/TMECH.2021.3137461. (Year: 2022).*
(Continued)

*Primary Examiner* — Russell Frejd
*Assistant Examiner* — Ana D Thomas
(74) *Attorney, Agent, or Firm* — David Kelley; McCoy Russell LLP

(57) ABSTRACT

Methods and systems are provided for a drivetrain system comprising: a first prime mover for supplying a torque to a front axle; a second prime mover for supplying a torque to a rear axle; and a controller configured to, in response to a torque reversal, command the front axle and the rear axle to cross lash zones sequentially.

20 Claims, 15 Drawing Sheets

(51) Int. Cl.
*B60W 30/18* (2012.01)
*F01L 9/21* (2021.01)

(52) U.S. Cl.
CPC ..... *B60L 2240/423* (2013.01); *B60L 2260/28* (2013.01); *F01L 2009/2155* (2021.01)

(58) Field of Classification Search
CPC .. B60W 30/20; F01L 2009/2155; B60K 1/02; B60K 17/34
See application file for complete search history.

(56) References Cited

U.S. PATENT DOCUMENTS

| | | |
|---|---|---|
| 9,446,757 B2 | 9/2016 | Liang et al. |
| 9,873,422 B2 | 1/2018 | Yamazaki et al. |
| 9,944,285 B2 | 4/2018 | Doan et al. |
| 2007/0082787 A1* | 4/2007 | Houtman ............ B60K 23/0808 477/180 |
| 2017/0355362 A1 | 12/2017 | Reed et al. |
| 2018/0229714 A1 | 8/2018 | McCullough et al. |
| 2019/0283578 A1* | 9/2019 | Wang .................... B60K 17/346 |
| 2020/0039503 A1 | 2/2020 | Bowman et al. |
| 2021/0023944 A1 | 1/2021 | Ravichandran et al. |

OTHER PUBLICATIONS

P. Reddy, M. Shahbakhti, M. Ravichandran and J. Doering, "Real-Time Estimation of Backlash Size in Automotive Drivetrains," in IEEE/ASME Transactions on Mechatronics, vol. 27, No. 5, pp. 3362-3372, Oct. 2022. Date of publication Jan. 11, 2022, doi: 10.1109/TMECH.2021.3137461. (Year: 2022).*

* cited by examiner

CLUNK AND SHUFFLE MANAGEMENT IN MULTI-MOTOR, MULTI-AXLE ELECTRIFIED DRIVETRAINS

CROSS REFERENCE TO RELATED APPLICATION

The present application claims priority to Indian Patent Application No. 202241004895 filed on Jan. 28, 2022. The entire contents of the above-listed application is hereby incorporated by reference for all purposes.

FIELD

The present subject matter relates to a system and a method for clunk and shuffle management in a multi-motor, multi-axle electrified drivetrain of a vehicle, particularly an electric vehicle.

BACKGROUND/SUMMARY

Generally, a drivetrain system of a vehicle, in particular an electric vehicle is connected to drive axles of the vehicle. In an example, the drivetrain system is connected to drive axles of the vehicle via a gear mesh. The drivetrain system is used to transfer torque to wheels of the vehicle. During the operation, the drivetrain systems, for example, electric vehicle drivetrains, may be affected by backlash and compliance making the torque transfer to the wheels difficult. The backlash or lash may be caused due to a clearance or a play between mating parts. In the drivetrain system, the backlash occurs due to a clearance between the rotating drivetrain components such as teeth of gears present in a transmission of the vehicle. Generally, manufacturing tolerances, bearing dimensions, thermal considerations, and other practical considerations contribute to backlash. Other reasons are to leave space for lubricants, reduce friction in the gears, and/or allow for metal expansion. Compliance may occur due to the flexibility of the rotating drivetrain components such as flexibility of half-shafts In one example, if a step increase of torque or a step decrease of torque is applied by the actuator in response to the driver pressing the accelerator pedal or releasing the accelerator pedal, the backlash may be traversed rapidly. Such rapid traverse of the backlash may result in clunk and shuffle phenomena. Particularly, clunk (e.g., also called shunt) refers to a sensation of the teeth of gears caused upon contact after crossing the lash zone or the zero torque point. Shuffle refers to oscillations caused by the periodic twisting and untwisting of the shafts, for example, half-shafts. Shuffle oscillations may take place in the drivetrain systems even during the scenarios wherein the backlash is not traversed. The clunk is uncomfortable and manifests as an audible noise in a frequency range of 1 kilohertz (kHz) to 5 kHz. The shuffle manifests as a longitudinal vehicle jerking in a frequency range of 1 Hz to 15 Hz.

Other attempts to address clunk resulting from backlash include torque shaping through the lash zone. Russell and Kotwicki in U.S. Patent Ser. No. 62/666,597 teach a system and method for transitioning the lash zone based on a speed ratio estimate across a torque converter. When near the lash zone, engine torque may be adjusted at a predetermined rate until the system passes through the lash zone. Engine torque slowed down going through the lash zone in this way minimizes clunk by bringing the gear teeth into contact gently.

However, the inventors recognize potential issues with such systems. As one example, torque shaping to minimize clunk in dual motor vehicles with separate drivetrains is particularly challenging. One such drivetrain includes a 2-motor electric drivetrain, such as a 2-P4 electric drivetrain (2-P4 BEV), where a front motor is provided at a front axle, and a rear motor is provided at a rear axle. In some examples, during operation of a 2-P4 BEV drivetrain, differing amounts of the backlash affect the rear motor versus the front motor. In some examples, one of the two axles (front or rear) is equipped with a wheel-end disconnect (WED) hub, which may result in a larger amount of backlash. Moreover, differing amounts of the compliance in the rear half-shafts versus the front half-shafts, in some examples due to part-to-part manufacturing variations, or due to differences in rear axle versus front axle specifications and/or components, may contribute to clunk and shuffle. Further, CAN communication delays between the rear motor control module or primary drive control module (PDCM), and the front motor control module or secondary drive control module (SDCM) may contribute to clunk and shuffle in 2-motor electric vehicle configurations.

In one example, the issues described above may be addressed by a system for a drivetrain system comprising: a first prime mover for supplying a torque to a front axle; a second prime mover for supplying a torque to a rear axle; and a controller configured to, in response to a vehicle wheel torque reversal, command the front axle and the rear axle to cross lash zones sequentially. In this way, based on coordinating torque shaping for a first motor and a second motor, clunk and the shuffle phenomena are reduced to acceptable levels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
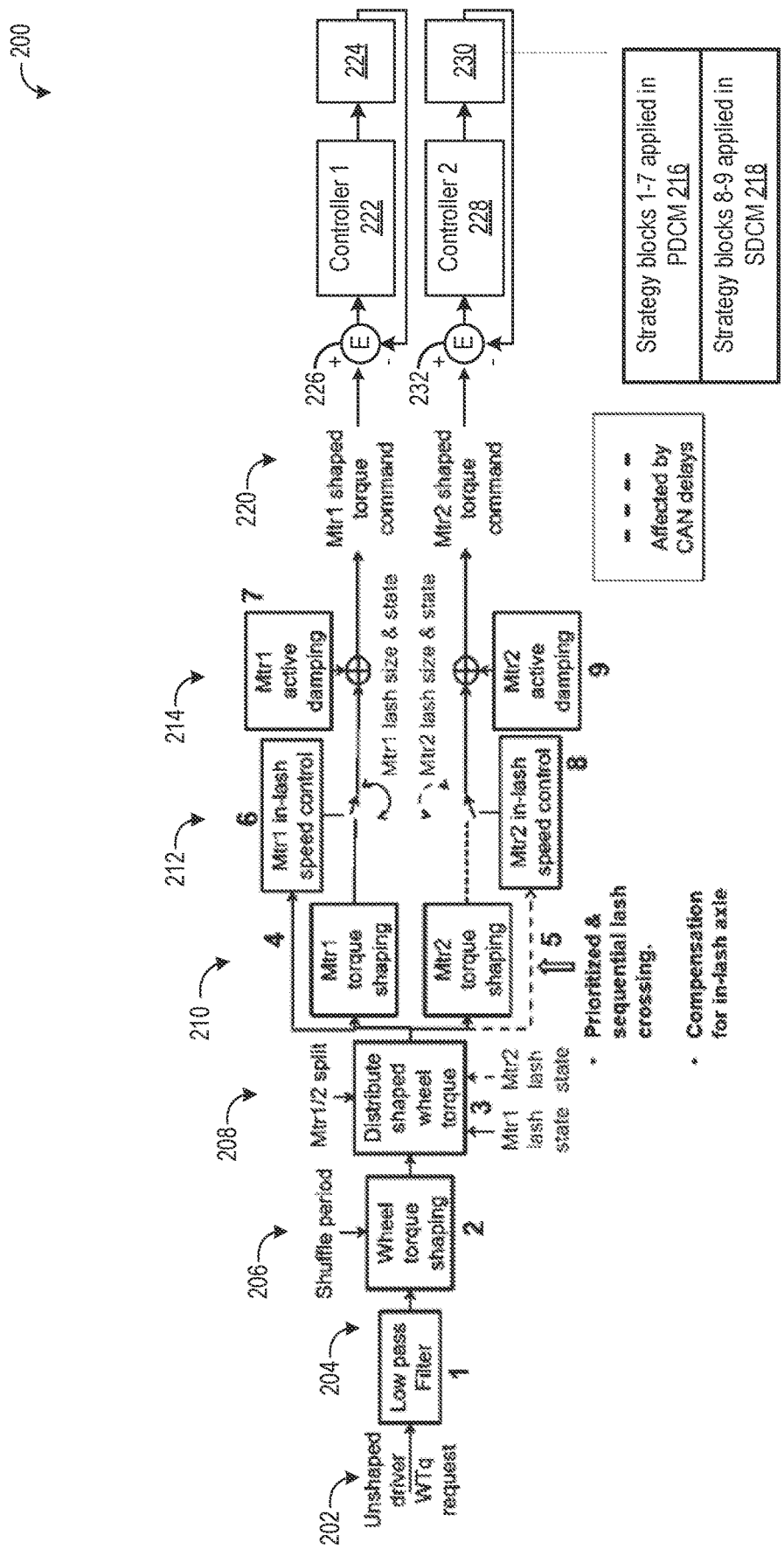
FIG. 2 is a block diagram of a coordinated torque shaping control system.
Figure 3:
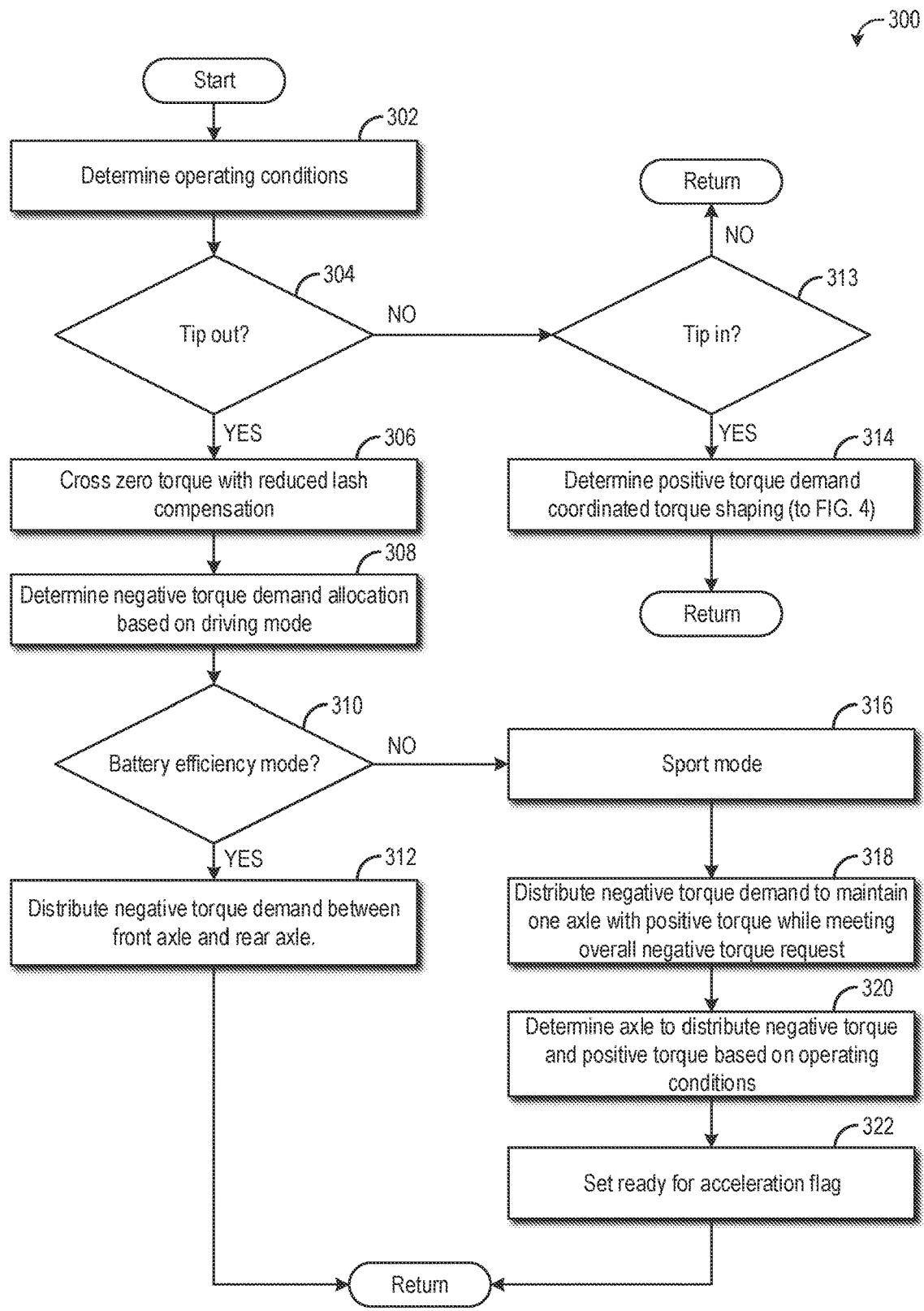
FIG. 3 is a flowchart illustrating an example control routine for the coordinated torque shaping control system.
Figure 4:
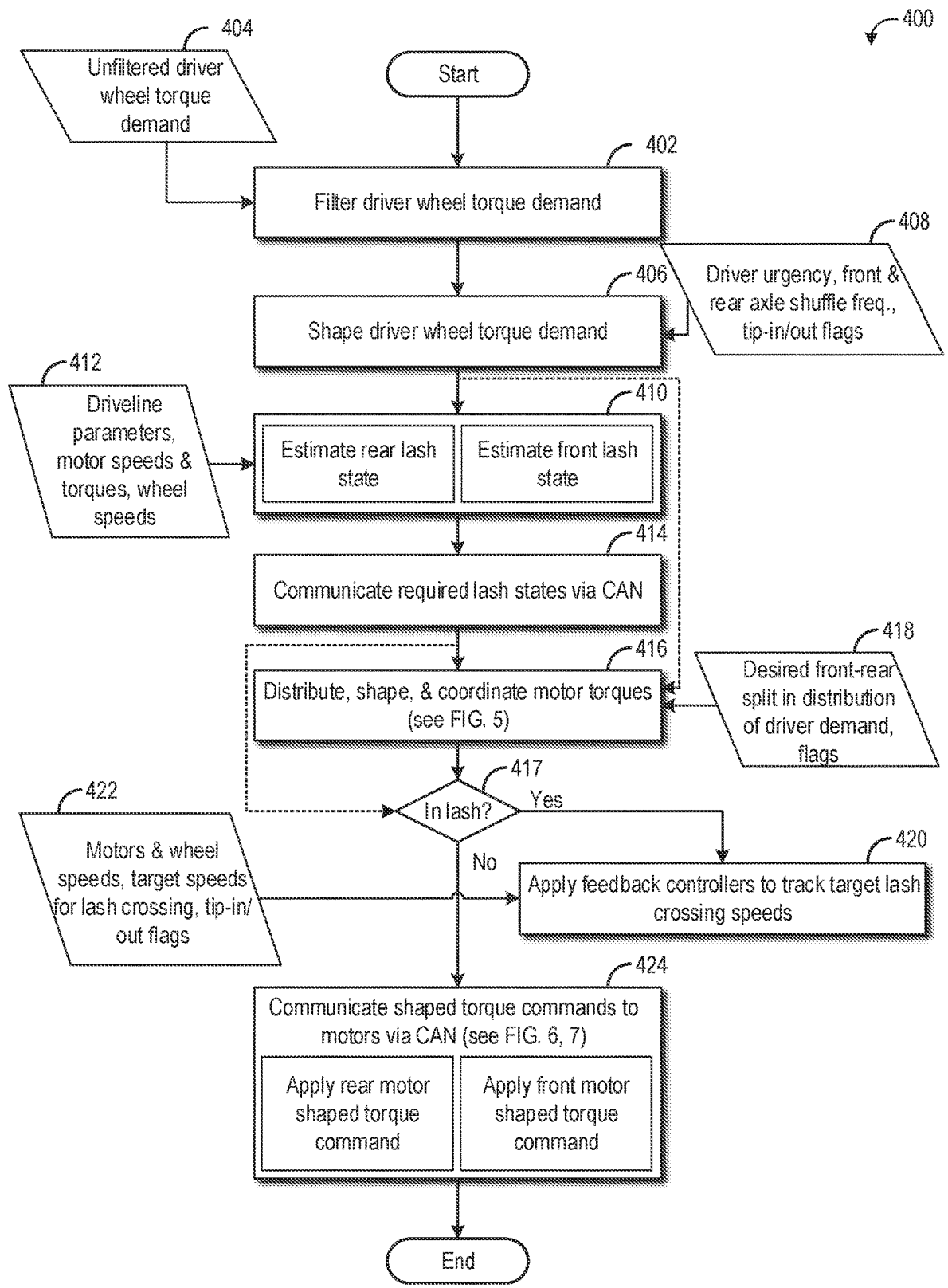
FIG. 4 is a flowchart illustrating a second example control routine for the coordinated torque shaping control system.
Figure 5:
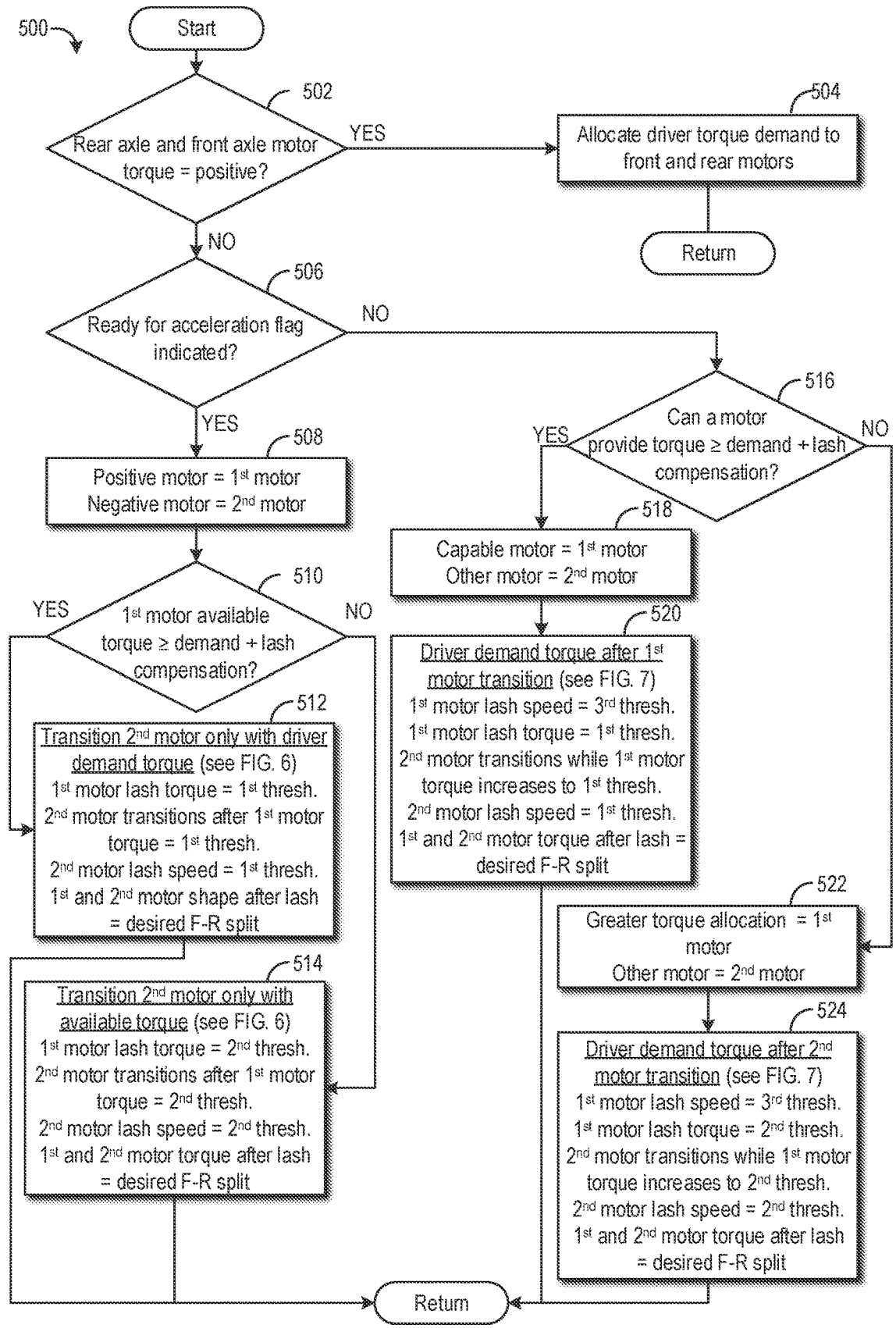
FIG. 5 is a flow chart illustrating a third example control routine for the coordinated torque shaping control system.
Figure 6:
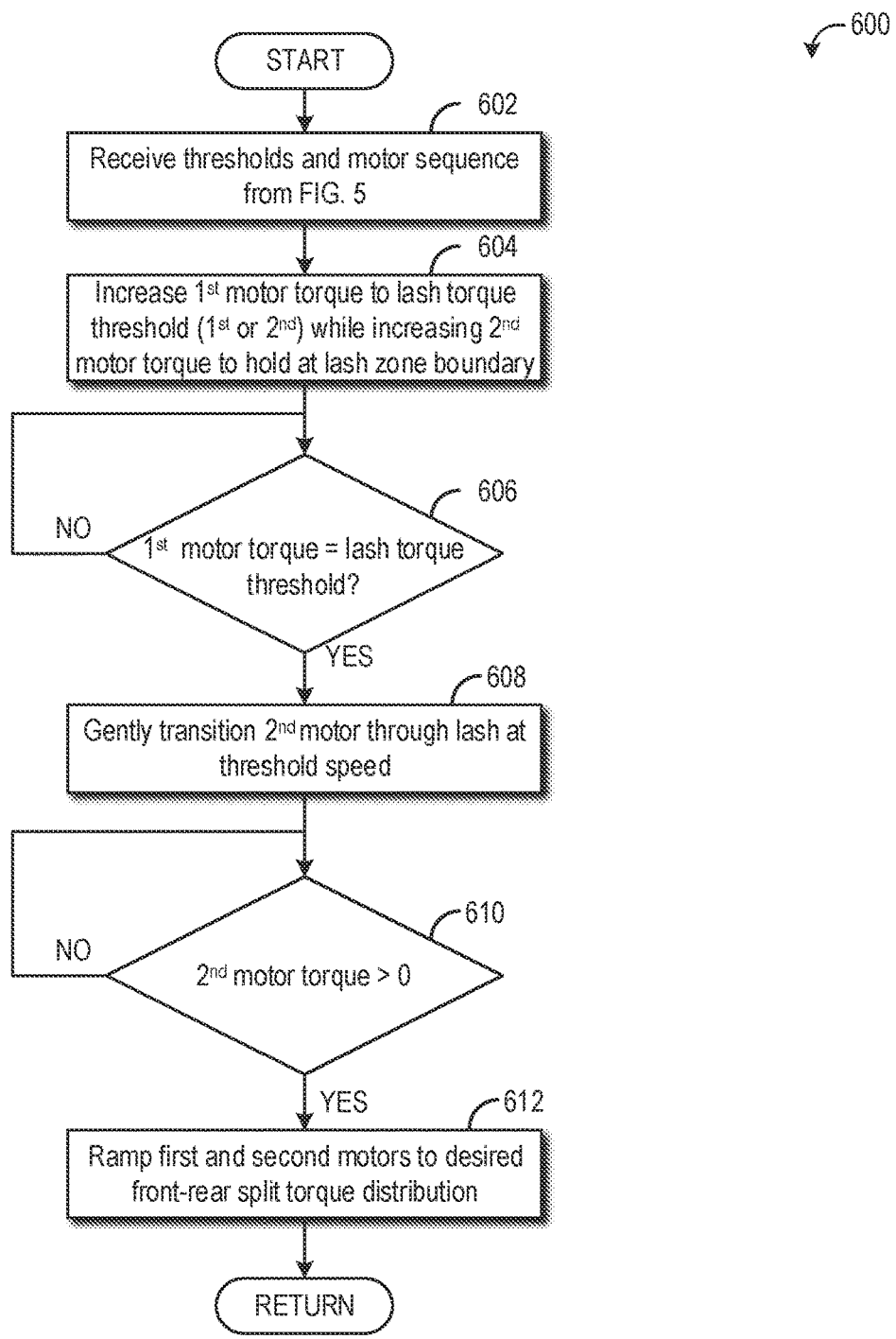
FIG. 6 is a flow chart illustrating a fourth example control routine for the coordinated torque shaping control system.
Figure 7:
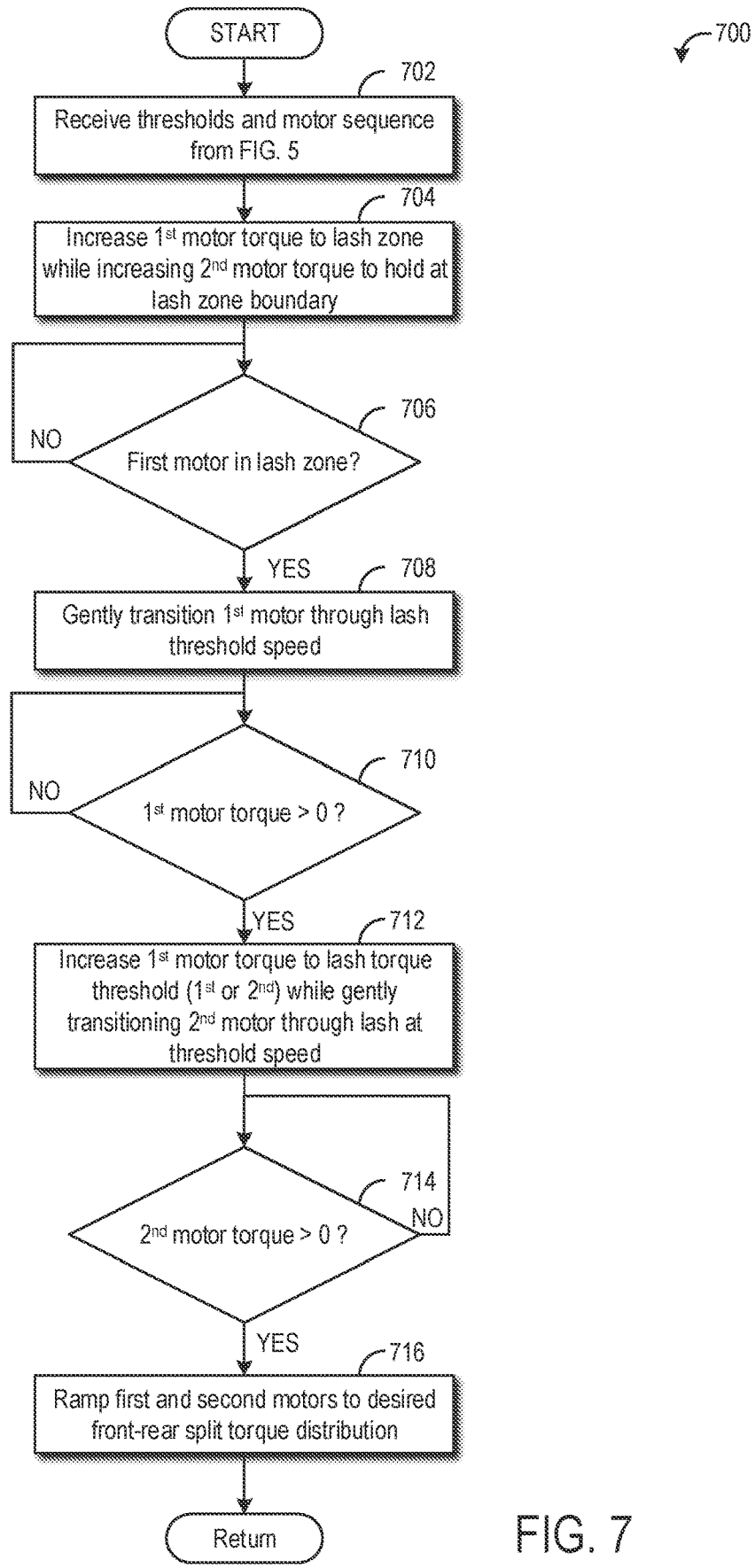
FIG. 7 is a flow chart illustrating a fifth example control routine for the coordinated torque shaping control system.
Figure 14:
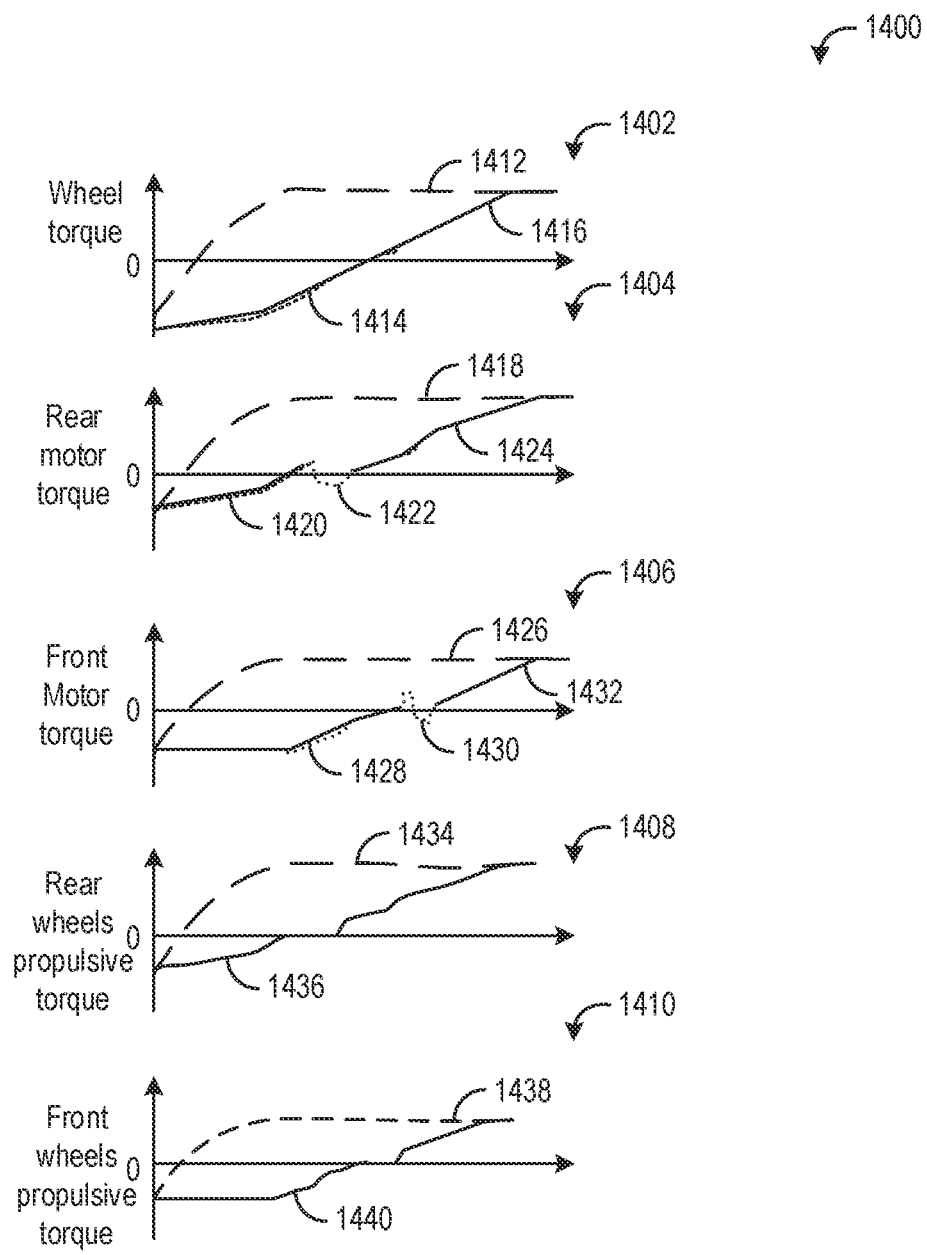
FIG. 14 is an example illustration of proposed behavior for a coordinated torque shaping control system.
Figure 15:
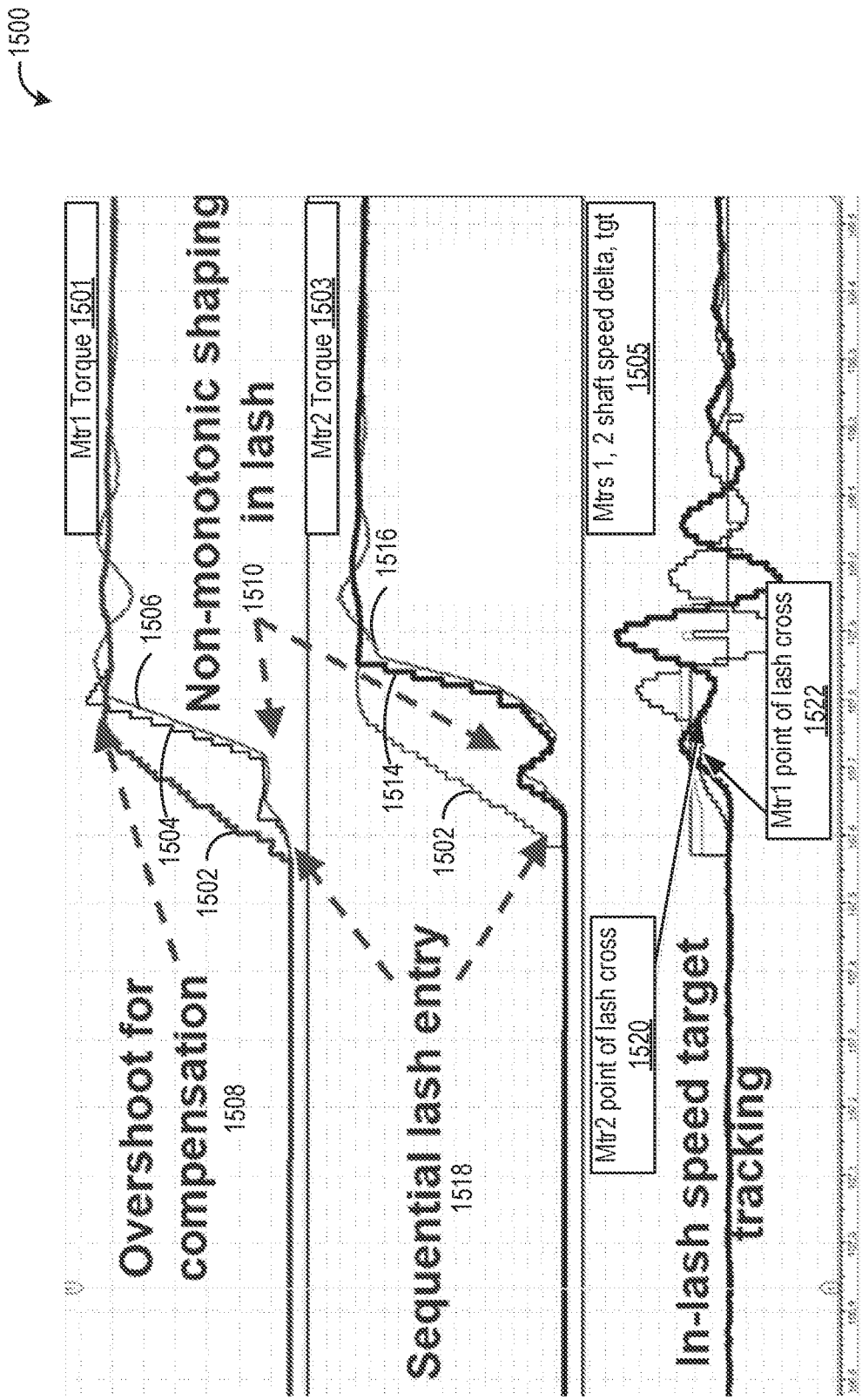
FIG. 15 is a second example illustration of proposed behavior for a coordinated torque shaping control system.

The following description relates to systems and methods for a multi-motor, multi-axle electrified drivetrain of a vehicle, particularly for increasing drivability. Common nomenclature for battery electric vehicle drivetrain architecture denotes possible positions of an electric motor. One such architecture is 2-P4 arrangement allowing for four-wheel drive capability in which an electric motor is placed at each axle of the vehicle. An example schematic diagram of a 2-P4 electric drivetrain for a vehicle is given in FIG. 1. To manage potential clunk and the shuffle during a torque reversal, a coordinated torque shaping control strategy may be used that is distributed across a primary drive control module (PDCM) and a secondary drive control module (SDCM). Such a system is illustrated in FIG. 2. FIG. 3 is a flowchart of a first control routine 300 for operating the system described in FIGS. 1 and 2. FIG. 4 is a flowchart of a second control routine 400 for operating the system described in FIGS. 1 and 2. FIG. 5 is a flowchart of a third control routine 500 for operating the system described in FIGS. 1 and 2 and may be implemented as a subroutine of FIG. 4. FIG. 6 is a flowchart of a control routine 600 for operating the system described in FIGS. 1 and 2 and may be implemented additionally or alternatively as a subroutine of FIG. 4. FIG. 7 is a flowchart of a control routine 700 for operating the system described in FIGS. 1 and 2 and may be implemented additionally or alternatively as a subroutine of FIG. 4. FIGS. 8, 9, 10, 11, 12, and 13 are timing diagrams of prophetic examples of operating one or more of the control routines for coordinated torque shaping control system as described herein. FIG. 14 illustrates exemplary torque shaping during tip-in in accordance with the systems and methods described herein. FIG. 15 illustrates an example of proposed lash transition behavior for a first and second motor in accordance with an implementation of the systems and methods described herein.

Figure 1:
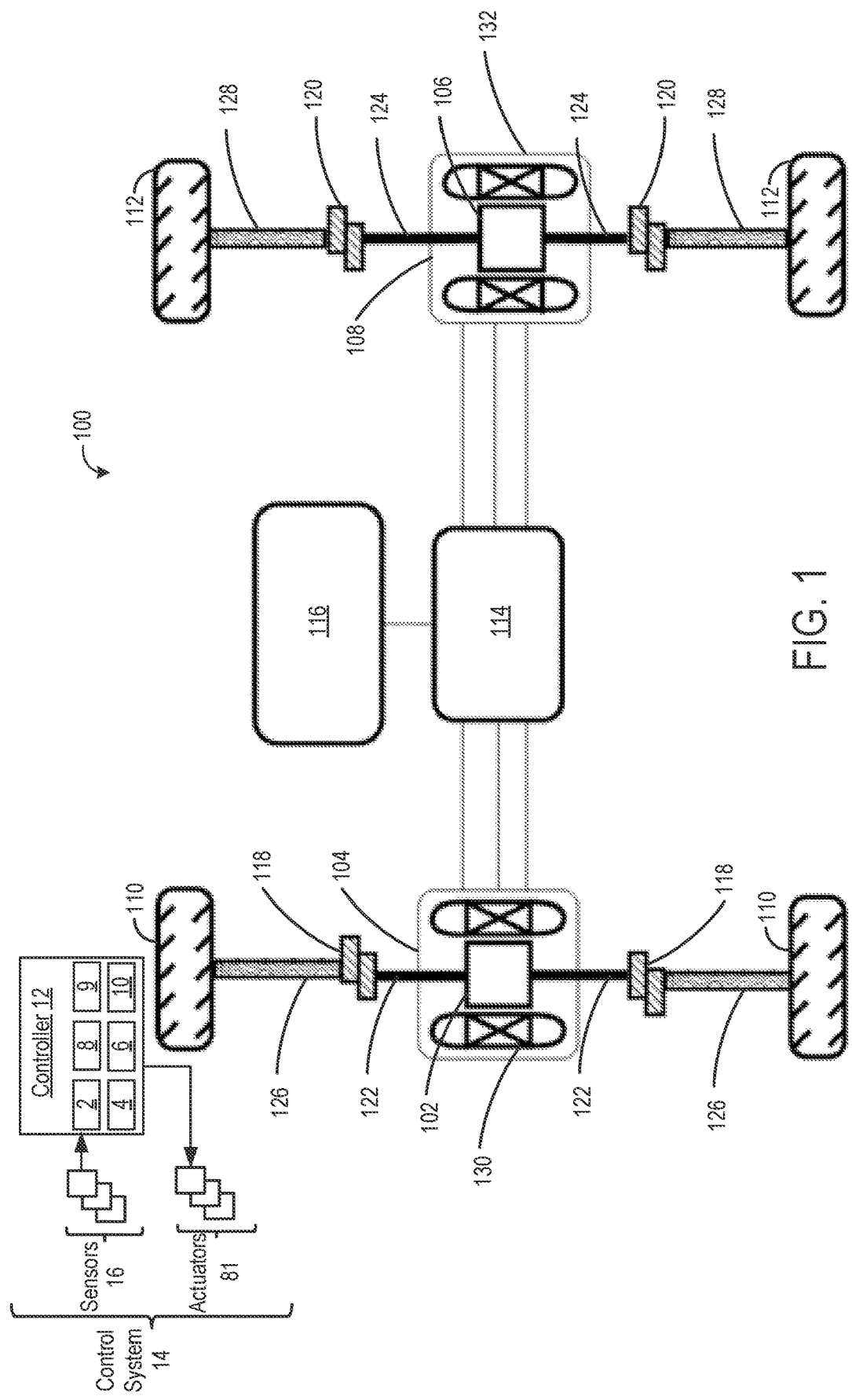
FIG. 1 is a schematic diagram of a drivetrain for an electric vehicle.

FIG. 1 is a schematic of an example drivetrain 100 for an electrical vehicle. Drivetrain 100 is shown with a first prime mover (e.g., a propulsive force electric machine) or electric motor 102 for supplying a torque to a front axle 104, a second prime mover (e.g., a propulsive force electric machine) or electric motor 106 for supplying a torque to a rear axle 108. In one example, the front axle 104 and the rear axle 108 are separate. In other words, electric motor 102 does not supply torque to the rear axle 108 and electric motor 106 does not supply torque to the front axle 104. Electric motors 102, 106 are controlled via controller 12. In one example, electric motors 102, 106 are independent. For example, electric motors 102, 106 may have independently controlled torque and/or power and/or speed. Controller 12 receives signals from the various sensors 16 shown in FIG. 1. In addition, controller 12 employs the actuators 81 shown in FIG. 1 to adjust drivetrain operation based on the received signals and instructions stored in memory of controller 12.

Drivetrain 100 further includes front wheels 110 and rear wheels 112. In this example, front wheels 110 and/or rear wheels 112 may be driven via electric motors 102, 106. The rear axle 108 is coupled to electric motor 106. Electric motor 106 is shown incorporated into rear axle 108. The front axle 104 is coupled to electric motor 102. Electric motor 102 is shown incorporated into front axle 104. Electric motor 102 includes stator 130 and electric motor 106 includes stator 132. Electric motors 102, 106 may receive electrical power from power electronics assembly 114 and battery 116. In an example, battery 116 may be a 300 Voltage battery. Electric motor 102 may couple to front axle gear train 118 via front half shafts 122. Front wheels 110 may couple to front axle gear train 118 via front wheel shafts 126. Electric motor 106 may couple to rear axle gear train 120 via rear half shafts 124. Rear wheels 112 may couple to rear axle gear train 120 via rear wheel shafts 128.

Control system 14 may communicate with one or more of electric motor 102, front axle gear train 118, electric motor 106, and rear axle gear train 120. Control system 14 may receive sensory feedback information from one or more electric motor 102, front axle gear train 118, electric motor 106, and rear axle gear train 120. Example sensors may detect front and rear motor speeds, front and rear motor torque, front and rear wheels speeds, and front and rear axle parameters. Further, control system 14 may send control signals to one or more of electric motor 102, front axle gear train 118, electric motor 106, rear axle gear train 120, etc., responsive to this sensory feedback. Control system 14 may receive an indication of an operator requested output (e.g., torque increase, decrease) of the drivetrain system from a human operator, or an autonomous controller.

Controller 12 may comprise a portion of a control system 14. In some examples, controller 12 may be a single controller of the vehicle. Controller 12 is shown as a conventional microcomputer including: microprocessor unit 2, input/output ports 4, read-only memory 6 (e.g., non-transitory memory) for executable programs (e.g., executable instructions) and calibration values shown as non-transitory read-only memory chip in this particular example, random access memory 8, keep alive memory 9, and a conventional data bus. Controller 12 may include an interface 10. Interface 10 may include a variety of interfaces, for example, one or more interfaces for users. Interface 10 may include data output devices. The interface 10 may facilitate the communication of system 200 described below with various communication and electronic devices. In an example, interface 10 may enable wireless communications between system 200 and one or more other computing devices (not shown).

An electric vehicle, in general, may experience undesirable clunk and shuffle events. Clunks may be caused by mechanical couplings within the drivetrain of the vehicle during tip-ins, tip-outs, or brake applications. In one example, relevant couplings may include couplings between the front axle gear train 118 of the front axle 104 and the front wheels 110 and couplings between the rear axle gear train 120 of the rear axle 108 and the rear wheels 112. When torque is reversed in drivetrain 100, lash causes the mechanical connections in the drivetrain to disengage then reengage in the opposite direction. This is called lash crossing. If this lash crossing transition happens too quickly or abruptly, there may be a noise, vibration, and harshness (NVH) disturbance when the couplings re-engage. Lash may refer to clearance or lost motion in a mechanism caused by gaps between the mating parts. Shuffle refers to the oscillations caused by the periodic twisting and untwisting of the shafts. In one example, relevant shafts may include front half shafts 122 between front axle gear train 118 and electric motor 102, rear half shafts 124 between rear axle gear train 120 and electric motor 106, front wheel shafts 126 between front wheels 110 and the front axle gear train 118, and rear wheel shafts 128 between rear wheels 112 and rear axle gear train 120. Shuffle oscillations may take place in the drivetrain even during scenarios wherein the backlash is not traversed. The clunk manifests as audible noise and the shuffle manifests as longitudinal vehicle jerking.

To manage clunk and shuffle events in a multi-motor, multi-axle electric drivetrain, a controller may be configured to, in response to a torque reversal, command the front axle and the rear axle to cross the lash sequentially, and compensate for one axle lash using the other axle prime mover (e.g., electric motor). As one example, the prime mover of the other axle may overshoot a torque command for a controlled duration to compensate for the lash crossing of the other axle.

As one example, torque reversal is from negative torque to positive torque with regard to a direction of forward travel of the vehicle where forward is defined by the direction a driver is facing when seated in a driver seat. FIG. 2 shows a system 200 including modules for rear axle and front axle lash state estimation, low pass filter for driver wheel torque demand, wheel torque shaping, and wheel torque distribution and motor torque shaping, and motor torque shaping during lash crossing. In FIG. 2, Mtr1 refers to a first motor coupled to a first axle (front or rear) and Mtr2 refers to a second motor coupled to a second axle (front or rear). System 200 may be a control unit such as controller 12 having a processing resource. The processing resource may include microprocessors, microcomputers, microcontrollers, digital signal processors, central processing units, state machines, logic circuitries, and/or any other devices that manipulate signals and data based on computer-readable instructions (e.g., microprocessor unit 2 in FIG. 1). The coordinated torque shaping control strategy illustrated in system 200 may be distributed across a primary drive control module (PDCM) 216 and a secondary drive control module (SDCM) 218. In one example, strategy blocks 1-7 may be applied in PDCM 216 and strategy blocks 8-9 may be applied in SDCM 218. Operations that may be affected by CAN delays are indicated by dashed lines.

In an example, data, such as that related to an analysis performed by system 200 may be stored in a storage device coupled to system. The storage device may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes (e.g., read-only memory 6 in FIG. 1). The storage device may store an activity data.

In an example, system 200 is in communication with interface 10 (shown in control system 14 in FIG. 1). Interface 10 may facilitate the communication of system 200 with various communication and electronic devices. In the rear axle and front axle lash state estimation, the state of the lash, e.g., pre-lash, or in-lash, or post-lash, is determined for each of the first and second axles (front axle and rear axle) by computing the shaft displacement speed and the shaft twist. The inputs to rear axle lash state estimator determination computations are: rear motor speed, rear motor torque, rear wheels speeds, and rear axle parameters. The inputs to front axle lash state estimator determination computations are: front motor speed, front motor torque, front wheels speeds, and front axle parameters. Front and/or rear axle input parameter examples include stiffness, inertia, damping and so on. In an example, the computations may be carried out a Kalman filter may be applied to estimate the state of the lash.

At 202, an unshaped driver wheel torque request is received. At 204, the wheel torque request is modified by a low pass filter (e.g., strategy block 1). The low pass filter is intended to prevent to prevent abrupt changes in the wheel torque demand, especially during scenarios involving abrupt and repeated changes in the accelerator pedal position by the driver. For instance, during scenarios involving low vehicle speeds and pedal busyness, low pass filtering may minimize unnecessary changes in the sign of the torque demand and, therefore, may minimize unwanted lash crossings.

At 206, the system shapes the low pass filtered wheel torque request (e.g., strategy block 2). In the wheel torque shaping, the system generates a shaped, e.g., rate-limited, version of the filtered driver demand, in response to the driver tip-ins and tip-outs. This shaping/rate limit takes into account: the urgency of tip-in/out and shuffle frequencies of the rear axle and the front axle. In one embodiment, the proposed system computes a frequency $f_{shuffle,min}$, given by:

$$f_{shuffle,min} = \min(f_{shuffle,rear}, f_{shuffle,front}),\qquad(1)$$

where $f_{shuffle,rear}$ and $f_{shuffle,front}$ are the shuffle frequencies of the rear and front axles, respectively. Typically, these frequencies are obtained from vehicle tests and/or CAE models. Using this $f_{shuffle,min}$, the proposed system computes a ramp-rate, $rr_{shpd,wtq}$, for the shaped wheel torque command as:

$$rr_{shpd,wtq} = g \times \frac{Tq_{whl,dd,curr} - Tq_{whl,dd,init}}{T_{shuffle,min}},\qquad(2)$$

where: (a)

$$T_{shuffle,min} = \frac{1}{f_{shuffle,min}},$$

(b) $Tq_{whl,dd,curr}$ is the current value of the filtered driver torque demand; (c) $Tq_{whl,dd,init}$ is the initial value of the filtered driver torque demand, prior to the commencement of the shaping; and (d) g is a calibratable gain, which is scheduled as a function of the change in driver demand, e.g., $$g = g(Tq_{whl,dd,curr} - Tq_{whl,dd,init}).\qquad(3)$$

This gain, g(•), is intended to increase or decrease the ramp rate based on the urgency of the tip-in/tip-out, e.g., when the magnitude of $Tq_{whl,dd,curr} - Tq_{whl,dd,init}$ is large, g is selected large, and when the magnitude of $Tq_{whl,dd,curr} - Tq_{whl,dd,init}$ is small, g is selected small.

At 208, based on a desired front-rear split of the driver demand, the filtered wheel torque request is distributed amongst the front motor and the rear motor (e.g., strategy block 3). The front-rear split may be allocated differently during lash transition as compared to before and/or after lash transition. Inputs to determining the front-rear split of driver demand torque request include the first motor lash state and the second motor lash state. At 210, the front and rear motor torques are shaped such that each axle enters lash sequentially. In the example, shaped first motor torque (e.g., strategy block 4) brings the first axle through the lash followed by shaped second motor torque (e.g., strategy block 5) to bring the second axle through the lash. The first axle through the lash may be the front axle or rear axle and the compensating motor may be the motor of the other axle. During a first condition, the front axle may cross a lash zone first. During a second condition, the rear axle may cross a lash zone first. In one example, the axle that is allocated a larger portion of the driver demand may be prioritized to enter the lash first. In other examples, operating conditions or system specifications such as motor torque capacity may influence the sequence of lash crossing. The strategy includes the summation of the propulsive torques in the wheel domain equal to the shaped wheel torque demand. When one of the axles is traversing lash, the ramp-rate of the motor of the other axle increases above the torque command for a duration to compensate for the lash crossing. The compensating motor may be allowed to overshoot for a controlled duration (e.g., briefly) its allocation of the driver demand to provide torque during the lash crossing of the other axle. As front and rear axles cross sequentially, torque disturbance during lash transition may be reduced by compensating for one axle lash using the motor of the other axle. For example, during a tip-in, the motor of the axle designated to cross the lash second may provide a brief torque increase without crossing the lash to provide compensatory torque to support the first axle lash crossing. After the first axle traverses the lash, while second motor torque slows to gently bring the second axle through the lash, the first motor torque increases.

At 212, the system includes assigning each axle a target speed of lash crossing. As one example, the rate of change of torque for the axle transitioning first may be greater (e.g., faster) than the rate of change of torque of the axle transitioning second through the lash zone. In this way, driver-responsive acceleration may be provided with minimal delay. The motor torque is shaped to track the target speed. The calibrations of the target speeds take into account the driver urgency, tip-in or tip-out (e.g., flags), the requirement that each axle crosses lash sequentially. In one embodiment, the shaped motor torque command during the lash crossing can be computed as:

$$MTq_{in\text{-}lash,shpd} = k_{ff} \times \text{Speed}_{Target} + k_{fb} \times (\text{Speed}_{Target} - \text{Speed}_{Measured}), \quad (4)$$

where $k_{ff}$ and $k_{fb}$ are the feedforward and feedback control gains, respectively. In other embodiments, the shaped torque command could be generated by predictive control schemes, such as model-predictive control (MPC), or reference governor (RG), and so on.

At 214, each individual motor applies a damping torque, which, in some embodiments, could be computed using a lead-lag compensator or a lead compensator such as described in U.S. Pat. No. 9,446,757B2 and U.S. patent application Ser. No. 16/521,885, respectively. As one example, damping torque may be adjusted using a damping function based on a difference between a measured motor speed and a desired motor speed, including a filter in a forward loop to restrict the damping to within a predefined range. The lead-lag compensator may include a feedback loop to generate motor torque adjustment, which may be subtracted from the desired motor torque to calculate a commanded motor torque. The inputs to these compensators are the drivetrain parameters (e.g., shaft stiffness, motor inertia, etc.), the wheels speeds, and the motors speeds. In other embodiments, the damping torque could be calculated by predictive controllers, such as MPC or RG. The first motor crosses the lash with the determined in-lash speed control (e.g., strategy block 6) and active damping (e.g., strategy block 7). Then, the second motor crosses the lash with the determined in-lash speed control (e.g., strategy block 8) and active damping (e.g., strategy block 9) compensated by the first motor.

At 220, shaped motor torque commands for front and rear axle sequential lash transitions are applied using feedback from separate, independent controllers for the first and second motors. In one example, first controller 222 controls a speed of lash transition for the first axle (e.g., front or rear) using feedback control from one or more sensors 224 of the first motor (e.g., RPM sensors, torque sensors). A second controller 228 controls the speed of lash transition for the second axle (e.g., front or rear) using feedback control from one or more sensor 230 of the second motor. Electrical current 226, 232 may be adjusted (e.g., higher or lower) responsive to a threshold rate of change of motor RPM through the lash transition. In another example, first and second controllers control a rate of change of torque through the axle lash based sensor feedback from torque sensors.

The systems of FIG. 1 and FIG. 2 illustrate a system for coordinating torque shaping to minimize clunk and shuffle during a lash transition for multi-motor, multi-axle electrified drivetrains. The system filters and shapes wheel torque demand using front and rear axle parameters, motor speeds and wheel speeds to estimate lash states, and, in response to a torque reversal, coordinates sequential axle lash crossings including clunk and shuffle-minimizing adjustments. The system commands the front and rear axles to enter and exit their respective lash elements sequentially when sign of the demanded torque reverses (negative to positive or vice versa). The motor of the first axle to cross the lash may provide compensatory torque during the traverse of the other axle lash. The system may monitor and adjust speed of the lash crossing for each axle using feedback control. Due to the first and second axles crossing sequentially, the increased torque provided by motor of the first axle during the second axle lash does not exacerbate clunk and compensates for the remaining torque disturbance during the second axle lash cross. In this way, the acceleration profile during a tip-in may feel more natural and responsive.

FIG. 3, FIG. 4, FIG. 5, FIG. 6 and FIG. 7 illustrates example control routines for coordinated torque shaping during a torque reversal for a multi-axle, multi-motor electric vehicle system according to at least some of the embodiments of the present disclosure. FIG. 3 sets up control strategies for implementing the system described in FIG. 1 and FIG. 2 for torque reversal based on a driving mode and a tip-out condition. In one example, tip-out torque shaping may be controlled in a first driving mode such as a sport mode. In another example, tip-out torque shaping may be controlled in a second driving mode such as an economy mode herein referred to as battery efficiency mode or efficiency mode. As one example, with a driving mode selected negative torque demand may be distributed between the motors of the front and rear axles accordingly. As one example, coordinated torque shaping through a lash transition during a tip-in may be controlled based on operating conditions including the negative torque distribution between motors of the front and rear axles, driver torque demand, maximum front motor torque, and maximum rear motor torque, and so on. FIG. 4 illustrates a control routine or routine 400 for coordinated torque shaping. FIG. 5 illustrates a routine 500 for selecting a torque shaping strategy based on one or more conditions of the tip-in. FIG. 6 and FIG. 7 illustrate routine 600 and routine 700, respectively, for implementing a torque shaping strategy, such as described in FIG. 4 and FIG. 5. In some examples, FIG. 6 and FIG. 7 may be subroutines of FIG. 4. Instructions for carrying out control routine 300 and the rest of the control routines included herein may be executed by a controller based on instructions stored on a memory of the controller and in conjunction with signals received from sensors of the drivetrain system, such as control system 14, controller 12, and sensors 16 described above with reference to FIG. 1 and FIG. 2. The controller may adjust actuators of the drivetrain system to adjust drivetrain operation, according to the routines described below.

At 302, routine 300 includes determining operating conditions. Operating conditions may include a position of an accelerator pedal (e.g., tip-in, tip-out), wheel torque demand, a driver or controller selected driving mode, road conditions (e.g., weather, terrain), front motor speed, rear motor speed, wheel speed, and so on.

At 304, routine 300 includes determining whether a tip-out is indicated. If a tip-out is not indicated, the routine continues to 313. At 313, the routine includes determining whether a tip-in is indicated. If a tip-in is indicated, at 314 the routine directs to FIG. 4, where coordinated torque shaping for positive torque demand is described in detail.

Returning to 304, if a tip-out is indicated, the routine continues to 306. At 306, routine 300 includes crossing zero torque with reduced lash compensation. In one example, crossing the lash during a tip-out may produce very minimal clunk and the lash may be traversed without special shaping. In other examples, the routine may include reducing the rate of change of torque but the threshold limit may be set at a faster rate of change (negative) than the allowed limit during a positive tip-in rate of change when limiting torque through lash zone.

At 308, the routine includes determining negative torque demand allocation based on driving mode. Driving mode may be selected by a driver prior to the tip-out, for example by actuating a button, and the controller may store the indication upon driving mode selection. In another example, driving mode may be determined by the controller, for example, based on operating conditions such as battery charge level, road conditions, and so on.

At 310, the routine determines whether battery efficiency mode is indicated. As one example, battery efficiency mode controls the front motor, rear motor, and accessories to conserve battery charge. In one example, in efficiency mode, one of the front motor or the rear motor may provide a first negative torque and the other of the front motor or the rear motor may provide a second negative torque, the sum of the first negative torque and the second negative torque being equal to the total driver demand torque. In another example, one of the front axle or the rear axle may be selected to transition a lash first based on a torque capacity of each of the motors of the front axle and rear axle and driver tip-in magnitude.

If battery efficiency mode is indicated, at 312 the routine includes distributing the total negative torque demand between the motors of the front and rear axle such that the both motors cross the lash and provide negative torque. The negative torque demand may be distributed equally or non-equally between the front and rear motors. The negative torque demand may be low pass filtered and rate-limited wheel torque demand such as described in FIG. 2. In this way, shuffle reduction may be incorporated into the negative torque applied responsive to the tip-out indication. The sum torques of the front and rear motors is equal to the total negative torque demand. As one example, if filtered wheel torque demand is −100 pound-feet (lb-ft), the controller may distribute −50 lb-ft to front motor and −50 lb-ft to the rear motor.

If at 310 battery efficiency mode is not indicated, at 316 the routine determines sport mode is indicated. In sport mode, responsive to a tip-out, negative torque demand is distributed non-equally between the motor of the front axle and the motor of the rear axle such that the only one motor traverses the zero torque point. In sport mode, one of the front motor or the rear motor may provide negative torque and the other of front motor or rear motor may provide positive torque, the sum of the negative torque and positive torque equal to a total driver demand torque. As one example, sport mode controls the motors of the front and rear axle to provide immediate positive torque response during a tip-in.

At 318, routine 300 includes distributing the total negative torque demand to maintain one axle with positive torque while meeting the overall negative torque request. The negative torque demand may be the low pass filtered and rate-limited wheel torque thus incorporating shuffle reduction, such as described in FIG. 2. The sum torques of the front and rear motors is equal to the total negative torque demand. For example, if the filtered wheel torque demand is −100 pound-feet, the controller may reduce the torque generated by a first motor to 5 lb-ft and reduce the torque generated by a second motor to −105 lb-ft. By distributing non-equally the negative torque demand, during a tip-in, the motor generating low positive torque may provide immediate acceleration without clunk (e.g., no lash crossing).

At 320, the routine includes determining the axle to distribute the negative torque request and the positive torque request based on operating conditions. For example, the motor with the greater torque generating capacity may be selected to stay positive to enable the most torque for on-demand acceleration and the other axle may be selected for negative torque. As another example, if the torque capacity is the same for the front and rear motor, the selection may be based on the temperature of the motor (e.g. motor windings). For example, the lower temperature motor may be selected to stay positive. As another example, driving conditions may determine which motor may be selected to stay positive. For example, vehicle stability control during inclement weather or while handling curved roads may inform the selection. As another example, at 322, the routine includes setting a ready for acceleration flag. The ready for acceleration flag may be read by the controller to determine a torque shaping strategy during a tip-in.

As an example, maintaining the vehicle in sport mode may increase torque responsiveness during a tip-in by leaving one motor at greater than zero torque. In this way, a first motor is available to provide immediate torque in response to a torque demand sign change without needing to cross a lash, and therefore not needing any torque shaping through the lash.

FIG. 4 illustrates routine 400 for coordinating and distributing torque in a multi-motor, multi-axle electrified drivetrain. In one embodiment, routine 400 may be executed following an indication of a tip-in, such as described in routine 300. Additionally or alternatively, routine 400 may be executed during tip-in or tip-out for coordinating and distributing positive or negative torque demands, respectively. In the flow chart, dash lines indicate transfer of information from prior calculations to future calculations.

At 402, routine 400 includes filtering an unshaped driver wheel torque demand. The input to the shaping calculation is an unshaped driver wheel torque request at 404. As one example, the unshaped driver wheel torque request may be generated by a driver tip-in read by a pedal position sensor (e.g., one of sensors 16 in FIG. 1). As one example, filtering the raw pedal input may increase drivability by reducing the effect of pedal busyness and minimizing unnecessary lash crossings. The filtered driver wheel torque demand is shaped at 406. At 408, shaping calculation inputs include driver urgency, front and rear axle shuffle frequencies, and tip-in/out flags such as described with respect to FIG. 2. Wheel torque shaping incorporates operating conditions into a ramping rate with a calibratable gain. As one example, the ramping rate may include how quickly or slowly a torque demand is met. For example, when driver urgency is high, the ramp rate may increase torque to the demanded torque more quickly than when driver urgency is low.

At 410, the routine includes estimating rear lash state and front lash state. During the estimation, driveline parameters, motor speeds and torques, and wheel speeds may be considered at 412. For example, the calculations for the state of the lash, e.g. pre-lash, in lash, post-lash, may be estimated with inputs including drivetrain parameters such as shaft stiffness and motor inertia, motor speeds and torques, and wheel speeds, such as described with respect to FIG. 2. At 414, the routine 400 lash states are communicated via CAN.

At 416, the routine 400 includes distributing, shaping, and coordinating motor torques based on the shaped wheel torque demand calculated at step 406. In one example, distributing the filtered wheel torque demand may include a torque distribution ratio between the front and rear motors. For example, torque may be distributed equally (e.g., 50:50 ratio) or non-equally (e.g., 20:80 ratio). In one example, distributing the torque may include determining sequential entry of the rear axle and the front axle into their respective backlash elements. Shaping may include compensating the axle that is crossing backlash using the motor of the other axle that has exit backlash. For example, the front axle having the crossing backlash may be compensated using the motor of the rear axle having the exit backlash. During transition through the lash of the selected one of the front axle and rear axle, the motor of the selected axle may be adjusted to briefly overshoot a torque command for a controlled duration to compensate for the lash transition. The front-rear distribution of driver demand may be split differently during lash transition as compared to before and/or after the transition. For example, the torque distribution ratio between the front and rear motors may be split equally before and after lash, and non-equally during sequential lash crossing. In one embodiment, routine 500 in FIG. 5 may be executed for distributing, shaping, and coordinating motor torques during a tip-in. At 418, example inputs for determining the distribution, shape and coordination of front and rear motor torques include desired front-rear split in distribution of driver demand and flags (e.g., ready to accelerate flag from FIG. 3, tip-in/tip-out flags). As an example, desired front-rear split in distribution may be determined based on a manufacturer setting, operating conditions, a control routine, and so on.

In another example, distributing, shaping, and coordinating motor torques may include determining a size and duration of a torque increase or torque bump for the motor compensating the lash crossing of the other axle. As one example, the size and duration of the torque bump on motor of the first axle during the second axle lash may be proportional to a rate of the second axle lash transition. For example, when the driver demand is urgent, the second axle lash crossing may be relatively quick and the corresponding torque bump on the first motor may be larger (e.g., higher, narrower torque increase). When driver torque demand is less urgent, lash crossing may be slowed proportionally to the demand. When the second axle lash crossing is slow the size of the torque bump on the first motor may be smaller (e.g., lower, wider torque increase). Thus, the rate of change of torque through an axle lash zone may determine compensatory motor torque condition size and duration.

At 417, routine 400 includes determining whether the lash transition is indicated. Lash transition may be indicated based on the lash states calculated at 410 and communicated to the CAN at 414. If lash transitioning is indicated, at 420 the routine includes applying feedback controllers to track target lash crossing speeds (also herein referred to as threshold speeds). For example, each of the front and rear axle lash speed may be adjusted using a reference tracking speed controller for each motor. As one example, separate first and second controllers for front and rear motors may control each axle lash independently using sensor feedback for adjusting speed of the lash transition. In addition, threshold speeds may be selected to achieve a desirable acceleration feel or jerk during the in-lash to post-lash transition by each axle. The speeds may minimize the shuffle in each of the two axles, using calibrated damping torques applied by each of the motors. The torque on the wheels can be tracked by the summation of the axle torques in response to the driver tip-ins and tip-outs. Feedback control at 420 enables modifying and adapting lash crossing to present and/or evolving operating conditions that may affect the drivetrain system. At 422, inputs to the feedback controllers include motor and wheel speeds, lash crossing target speeds, tip-in/out flags. Based on a threshold lash crossing speed and actual motor and wheel speeds, lash transition may be adjusted for reducing clunk while meeting torque demand as quickly as possible. If lash transition is not indicated, routine 400 includes communicating shaped torque commands to motors via CAN at 424. In one example, routine 400 may direct to FIG. 6 and FIG. 7 where routine 600 and routine 700 illustrate example sequential lash crossing commands during tip-in conditions.

FIG. 5 illustrates a routine 500 for coordinating torque shaping through a lash transition during an accelerator tip-in. In one embodiment, routine 500 may be a subroutine of routine 400 for distributing, shaping, and coordinating motor torques through a lash transition and may additionally or alternatively follow from a tip-in indication, such as described with respect to routine 300 in FIG. 3. As one example, during a tip-in, torque shaping and coordination may be based on whether the torque reversal requires the front and rear motor to cross the zero-torque point. If both motors will cross the zero torque point, the motor transition sequence may be based on torque capacity and driver tip-in magnitude.

At 502, routine 500 includes determining whether positive torque at the motors of the rear axle and front axle is indicated. As one example, the rear axle and front axle motors may both be positive during a tip-in if the immediately previous tip-out command was incomplete such that the lash was not traversed. In other words, the zero torque point was not crossed during the immediately previous tip-out. If positive torque at the rear axle and front axle motors is indicated, the routine continues to 504. At 504, the routine includes distributing driver torque demand to front and rear motors. For example, filtered and shaped driver wheel torque demand, such as described with respect to FIG. 2 and FIG. 4, may be distributed between the front and rear motors at the calculated ramp rate. As an example, torque demand may be distributed between the front and rear motors based on system specifications, driving conditions, and so on.

If positive torque at the rear axle and front axle motors is not indicated at 502, routine 500 includes determining whether a ready for acceleration flag is indicated at 506. As one example, a ready for acceleration flag may be indicated following a tip-out in sport mode. In response to a tip-out in sport mode, the negative torque request is distributed non-equally between the front and rear motors such that one of the motors is maintained generating positive torque and the other motor generates negative torque while meeting the overall torque request. The motor already generating positive torque may provide a faster torque response to a tip-in. In another example, the ready for acceleration flag may not be indicated following a tip-out in battery efficiency mode. In response to a tip-out in battery efficiency mode, the negative torque request may be distributed between the front and rear motors such that both of the motors (front and rear) generate negative torque to meet the overall torque request. If a ready for acceleration flag is indicated at 506, routine 500 includes designating the motor with positive torque as the first motor (front or rear axle) and the motor with negative torque the second motor (front or rear axle) at 508. Whether the front or rear axle motor is the motor generating positive torque may be determined by system specifications such as motor torque capacity, operating conditions such as motor temperature, driving conditions that may influence vehicle handling, and so on.

At 510, the routine includes determining whether the first motor (e.g., the positive motor) available torque is greater than or equal to the torque demand plus lash compensation. During sequential lash crossing, when the second axle is traversing the lash, the routine may include increasing the ramp rate and allocation (e.g., overshoot briefly and by a calibratable amount) of driver demand to the first motor of the other axle to compensate for the lash crossing. If the first motor can provide the lash compensation plus the torque demand (e.g., filtered and shaped wheel demand), the routine continues to 512.

At 512, the routine includes transitioning the second motor only with driver demand torque. The transition strategy includes calculating a first threshold lash torque: the torque demand plus lash compensation. The lash torque is the torque the first motor will generate during the lash transition of the second motor. In one example, the strategy includes transitioning the second motor through a lash region or the zero torque point after the first motor provides the faster torque response and reaches the first threshold lash torque. A lash crossing speed is set at a first threshold speed for the second motor. In one example, the second axle lash transition may be adjusted based on the torque limits of the first motor. For example, the first threshold speed may be relatively slower than the second threshold speed due to the first motor being capable of providing driver demand torque during the second axle lash transition. The lash crossing speed may be a reference speed calculated for the motor at the current operating conditions and/or system specifications. For example, the lash crossing speed may be determined based torque-providing capacity of the first motor, shuffle frequencies, driver urgency, operating conditions, etc., and as described in FIG. 2 and FIG. 4, and may be adjusted using feedforward and feedback control. Following the second motor lash transition, the transition strategy further includes ramping up the second motor torque and ramping down the first motor torque to the desired front-rear split. In other words, the second motor torque may be (more or less gently) increased and the first motor torque may be (more or less gently) decreased to the desired front-rear split. The desired front-rear split may be based on system specifications such as motor torque capacity, operating conditions such as motor temperature, driving conditions that may influence vehicle handling, and so on.

If the first motor cannot provide the calculated amount of compensation plus the torque demand (e.g., filtered and shaped wheel demand), the routine continues to 514.

At 514, the routine includes transitioning the second motor only with available torque. The transition strategy includes calculating the second threshold lash torque: the first motor available (e.g., maximum positive) torque. The strategy includes transitioning the second motor through the lash region after the first motor provides faster torque response and reaches the second threshold lash torque. The lash crossing speed is set at a second threshold speed for the second motor. In one example, the second threshold lash crossing speed may be relatively faster (e.g., more urgent) than the first threshold speed due to positive torque from the motors of the front and rear axle being necessary to meet the driver torque demand. As above, the lash crossing speed may be a calibratable reference speed calculated for the motor at the current operating conditions. Following the second motor lash transition, the transition strategy further includes ramping up the second motor torque and ramping down the first motor torque to the desired front-rear split. In one example, the aforementioned thresholds and motor sequence may be inputs for executing a coordinated lash transition when the ready to accelerate flag is indicated. An example routine is described in FIG. 6.

Returning to 506, if the ready for acceleration flag is not indicated, the routine continues to 516. At 516, routine 500 includes determining whether a motor (front or rear axle) can provide torque greater than or equal to the torque demand plus lash compensation. As described above, the routine may include increasing the ramp-rate and torque to a first motor to compensate for the second motor crossing the lash. Whether a motor (front or rear axle) can provide the torque demand plus lash compensation in some examples may be based on the torque capacity of the motor and the magnitude of the driver demand. If one of the motors can provide the lash compensation plus the torque demand (e.g., filtered and shaped wheel demand), the routine continues to 518.

At 518, routine 500 includes designating the motor capable of providing the torque demand as the first motor (front or rear axle) and the other motor as the second motor (front or rear axle). In one example, whether a motor of the front axle or rear axle is capable of providing the torque demand may be determined by the controller similarly as described above based on one or more conditions including operating conditions, system specifications, and so on.

At 520, routine 500 includes transitioning the first motor through the lash and providing driver demand torque immediately thereafter. The lash crossing speed is set at a third threshold speed for the first motor. In one example, the third threshold lash crossing speed may be calibrated to bring the first motor through the zero torque point with minimal clunk and shuffle at the same time providing the commanded torque. The transition strategy includes calculating the first threshold lash torque: the torque demand plus lash compensation. The strategy includes transitioning the second motor through the zero torque point while the first motor torque increases to the first threshold lash torque. The lash crossing speed is set at the first threshold speed for the second motor. In other words, the lash cross may be relatively slow (e.g., gentle) due to the first motor being capable of providing the torque demand. The lash transition speed thresholds may be specific to the first and second motors at the current conditions and adjusted based on feedback and feedforward control such as described in FIG. 2. As one example, the second motor may traverse the zero torque point after the first motor reaches the lash torque threshold. Following the second motor lash transition, the transition strategy further includes ramping up the second motor torque and ramping down the first motor torque to the desired front-rear split.

If neither motor can provide the torque demand (e.g., filtered and shaped wheel demand) plus the calculated amount of compensation, the routine continues to 522.

At 522, routine 500 includes designating the motor having the greater torque allocation as the first axle (front or rear axle) to cross the lash and the other motor as the second motor (front or rear axle). Front-rear torque allocation may be based on motor capacity such as due to system specifications and/or operating conditions. Additionally or alternatively, there may be a priority for different issues affecting first and second motor designation. For example, motor torque capacity may be given first priority. If the delta is between front and rear motor torque capacity is below a threshold, other aspects may be evaluated to determine first and second motor designation such as drive field preferences. For example, if the rear axle better handles torque disturbance, the rear axle may be designated the first to cross the lash.

At 524, the routine includes transitioning the first axle through the lash, transitioning the second axle through the lash compensated by the first motor, and driver demand torque provided thereafter. The lash crossing speed is set at the third threshold speed for the first motor. As above the lash crossing speed may be calibrated to gently cross the zero torque point with minimal clunk and shuffle while providing the commanded torque. The transition strategy includes calculating the second threshold lash torque: the first motor available (e.g., maximum positive) torque. The strategy includes transitioning the second motor through the zero torque point while the first motor torque increases to the second threshold lash torque. A lash crossing speed is set at the second threshold speed for the second motor. The second threshold lash crossing speed may be relatively faster (e.g., more urgent) than the first threshold lash crossing speed due to positive torque from the motors of the front and rear axle being necessary to meet the driver torque demand. As described above and with respect to FIG. 2, the lash crossing speeds for the first and second motor may be adjusted based on feedforward and feedback control. Following the second axle lash transition, the transition strategy further includes ramping up the second motor torque and ramping down the first motor torque to the desired front-rear split. In one example, the aforementioned thresholds and motor sequence may be inputs for executing a coordinated lash transition when the ready to accelerate flag is not indicated. An example routine is described in FIG. 7.

FIG. 6 illustrates an example routine 600 for executing sequential lash transition based on thresholds and motor sequence determined when a ready for acceleration flag is indicated such as described in FIG. 5. In one embodiment, routine 600 may be a subroutine of routine 400 for communicating shaped torque commands to motors via CAN in FIG. 4.

At 602, routine 600 includes receiving thresholds and motor sequence from routine 500 in FIG. 5. The motor sequence includes first motor (e.g., the motor generating positive torque) and second motor (e.g. the motor that will cross zero torque) designations. The thresholds include the first motor lash torque threshold and the second motor lash speed threshold. In other words, the torque the first motor will maintain for compensating the second axle lash transition and the speed through which the second motor will traverse the zero torque point. The lash torque threshold may be set at a first threshold torque (e.g., driver demand plus lash compensation torque) or a second threshold torque (e.g., maximum available). The lash speed threshold may be set at a first threshold speed (e.g., relatively slower) or a second threshold speed (e.g., relatively quicker) based on whether the first motor can temporarily provide driver demand torque or not.

At 604, with the first and second motor in torque control, routine 600 includes increasing the first motor torque to the lash torque threshold (e.g., first or second threshold torque) while increasing the second motor torque to hold at a lash zone boundary. In one example, routine 600 may adjust the amount of torque based on signal feedback from the lash state estimators. In one example, the lash zone boundary may be estimated based on motor torque, motor speed, wheel speeds, and axle parameters using the rear axle and/or front axle lash state estimators as described with respect to FIG. 2. The lash zone boundary may be a calibratable torque level that is close to the zero torque point without crossing the lash.

At 606, routine 600 includes determining if the first motor torque equals the lash torque threshold. If yes, the routine continues to 608. At 608, with the second motor in speed control, routine 600 includes gently transitioning the second axle through the lash at the threshold speed. Through the lash zone, feedback control may be applied to track the second motor lash crossing speed. The speed may be adjusted by comparing the threshold speed (e.g., target) to the actual speed. At 610, routine 600 includes determining whether the second motor has crossed the zero torque point. If not, speed control of the second motor through the zero torque point continues.

If the second motor crossing the zero torque point is indicated, the routine continues to 612. At 612, routine 600 includes ramping down the first motor torque and ramping up the second motor torque to the desired front-rear split torque distribution. The rate of the ramping may be based on various conditions such as driving mode (e.g., sport or battery efficiency), shuffle frequencies, driver urgency, and so on, such as described with respect to FIG. 2. As an example, the ramp rate may be increased relative to delta between the driver demand and the lash torque threshold.

FIG. 7 illustrates an example routine 700 for executing sequential lash transition based on thresholds and motor sequence determined when a ready for acceleration flag is not indicated such as described in FIG. 5. In one embodiment, routine 700 may be a subroutine of routine 400 for communicating shaped torque commands to motors via CAN in FIG. 4.

At 702, routine 700 includes receiving thresholds and motor sequence from routine 500 in FIG. 5. The motor sequence includes the order through which the motors of the front and rear axle will cross the zero torque point: the first motor (e.g., the capable motor, greater torque-allocated motor) and second motor (e.g. the other motor) designations. The thresholds include the lash torque thresholds and the lash speed thresholds. The lash torque threshold may be set at the first threshold torque (e.g., driver demand plus lash compensation torque) or the second threshold torque (e.g., maximum available for the first motor). The second motor lash speed may be set at the first threshold speed (e.g., relatively slower) based on whether the first motor can temporarily provide driver demand torque plus lash compensation or the second threshold speed (e.g., relatively quicker) if both motors will cross the lash before driver demand torque is provided.

At 704, with the first and second motor in torque control, routine 700 includes increasing the first motor torque to the lash zone while increasing the second motor torque to hold at the lash zone boundary. Similar to routine 600, routine 700 may adjust the second motor torque to a level that is close to the zero torque point without crossing the lash based on signal feedback from the rear axle and/or front axle lash state estimators as described with respect to FIG. 2.

At 706, routine 700 includes determining whether the first motor is in the lash zone. If the first motor is in the lash zone, the routine continues to 708. At 708, with the first motor in speed control, routine 700 includes gently transitioning the first axle through the lash at the threshold speed. At 710, routine 700 includes determining whether the first motor has crossed the zero torque point. If not, speed control of the first motor through the zero torque point continues If the first motor has crossed the zero torque point, routine 700 proceeds to 712. At 712, with the first motor in torque control and the second motor in speed control, first motor torque is increased to the lash torque threshold while gently transitioning the second axle through the lash at the threshold speed. At 714, routine 700 includes determining whether the second motor has crossed the zero torque point. If not, speed control of the second motor through the zero torque point continues.

If the second motor crossing the zero torque point is indicated, the routine continues to 716. At 720, routine 700 includes ramping down the first motor torque and ramping up the second motor torque to the desired front-rear split torque distribution. The rate of the ramping may be based on various conditions such as driving mode (e.g., sport or battery efficiency), shuffle frequencies, driver urgency, and so on. For example, when the first motor is not capable of providing the full driver demand torque, the second motor may ramp more quickly to the front-rear split torque demand than when the first motor is providing the demand temporarily.

Figure 8:
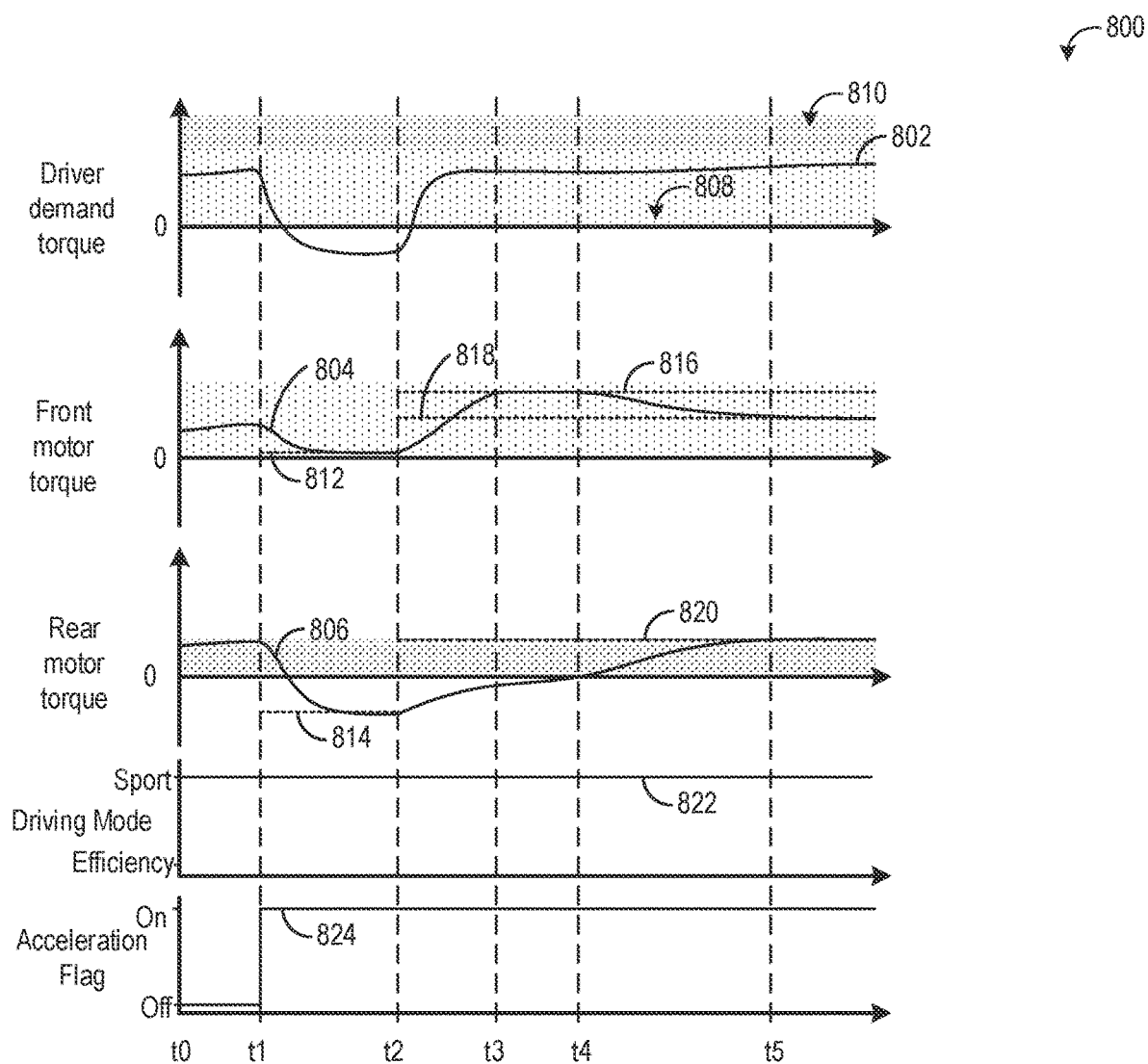
FIG. 8 is a timing diagram illustrating an example prophetic operation of the coordinated torque shaping control system for clunk and shuffle management.
Figure 9:
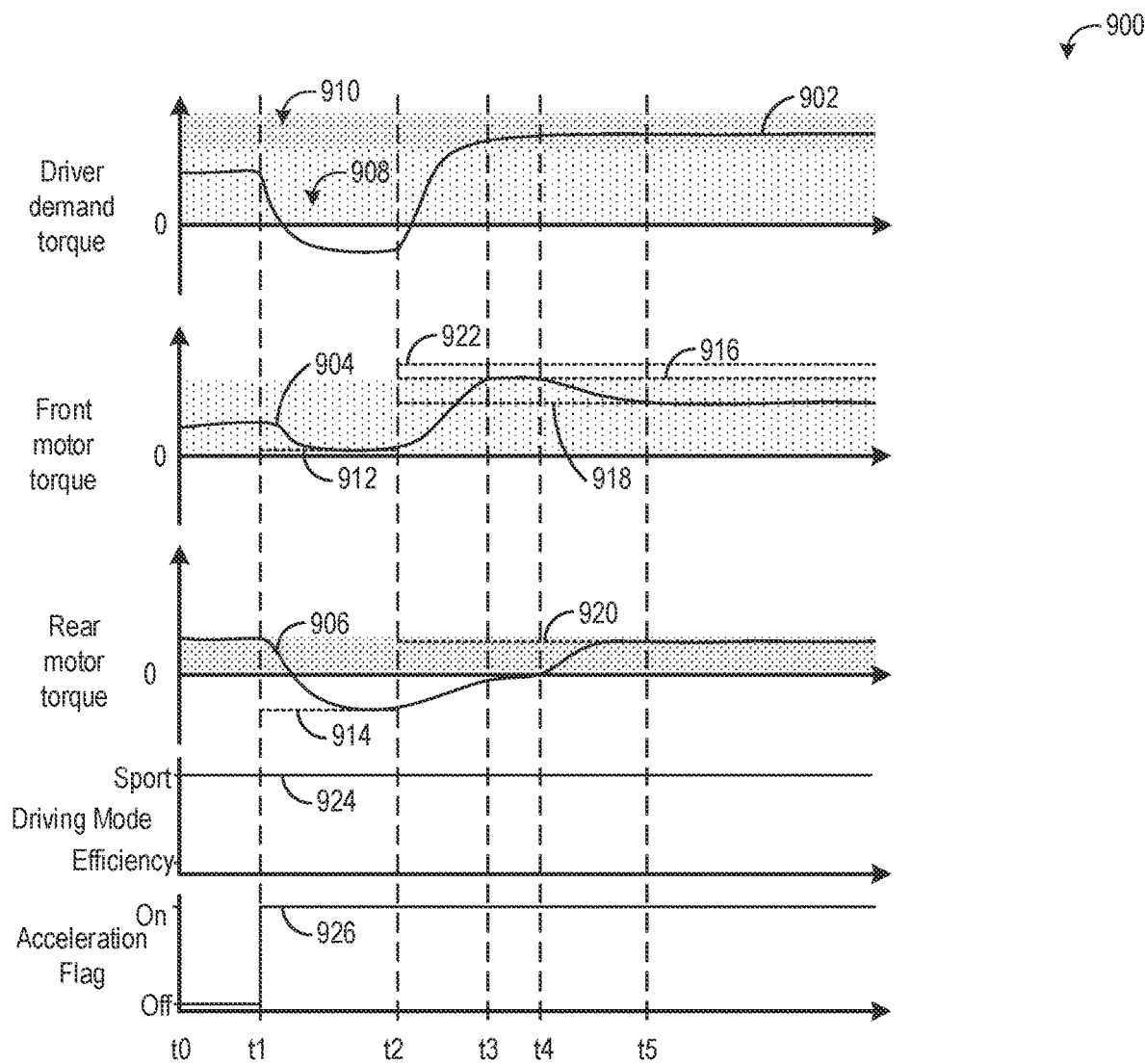
FIG. 9 is a timing diagram illustrating a second example prophetic operation of the coordinated torque shaping control system for clunk and shuffle management.
Figure 10:
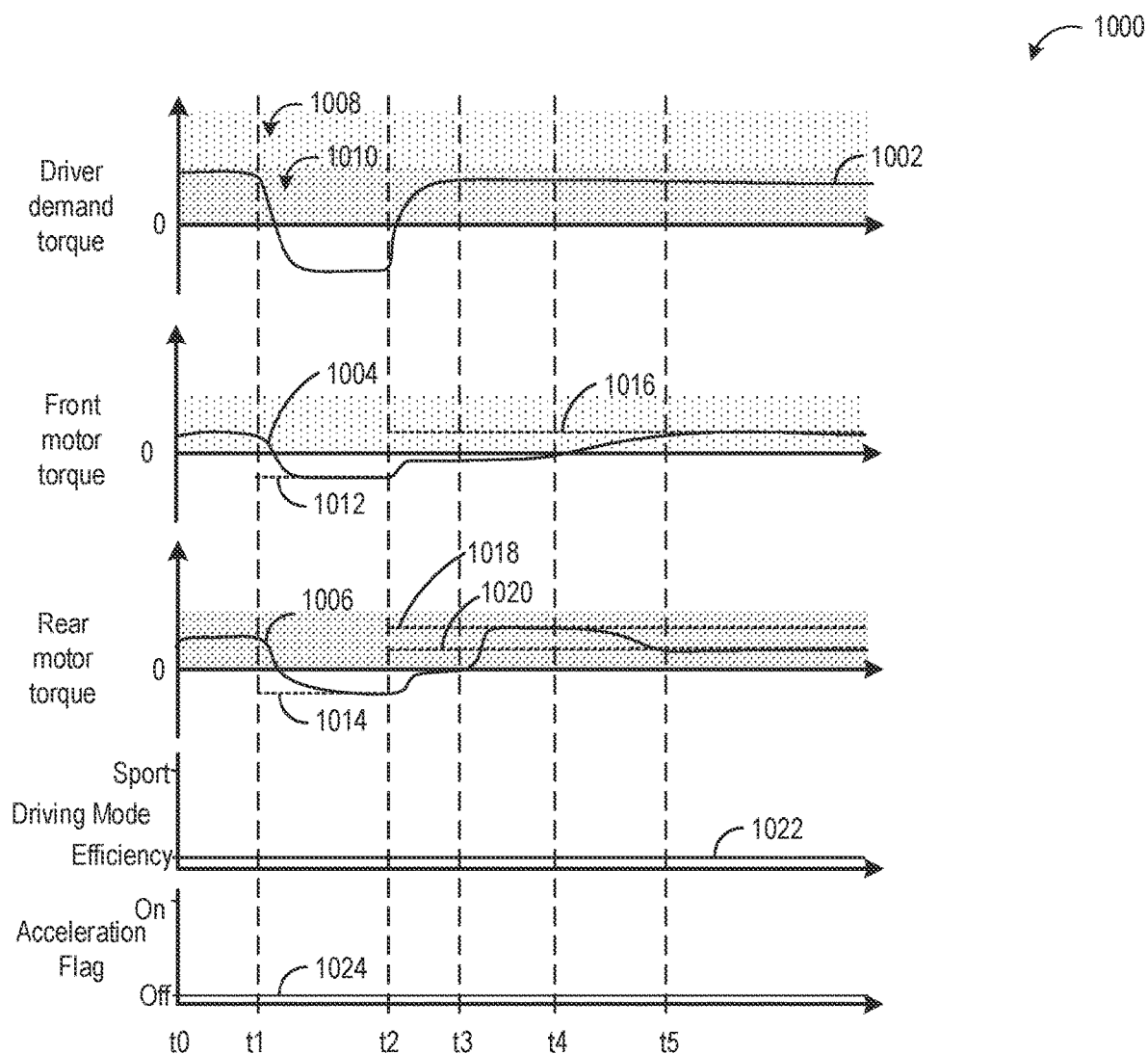
FIG. 10 is a timing diagram illustrating a third example prophetic operation of the coordinated torque shaping control system for clunk and shuffle management.
Figure 11:
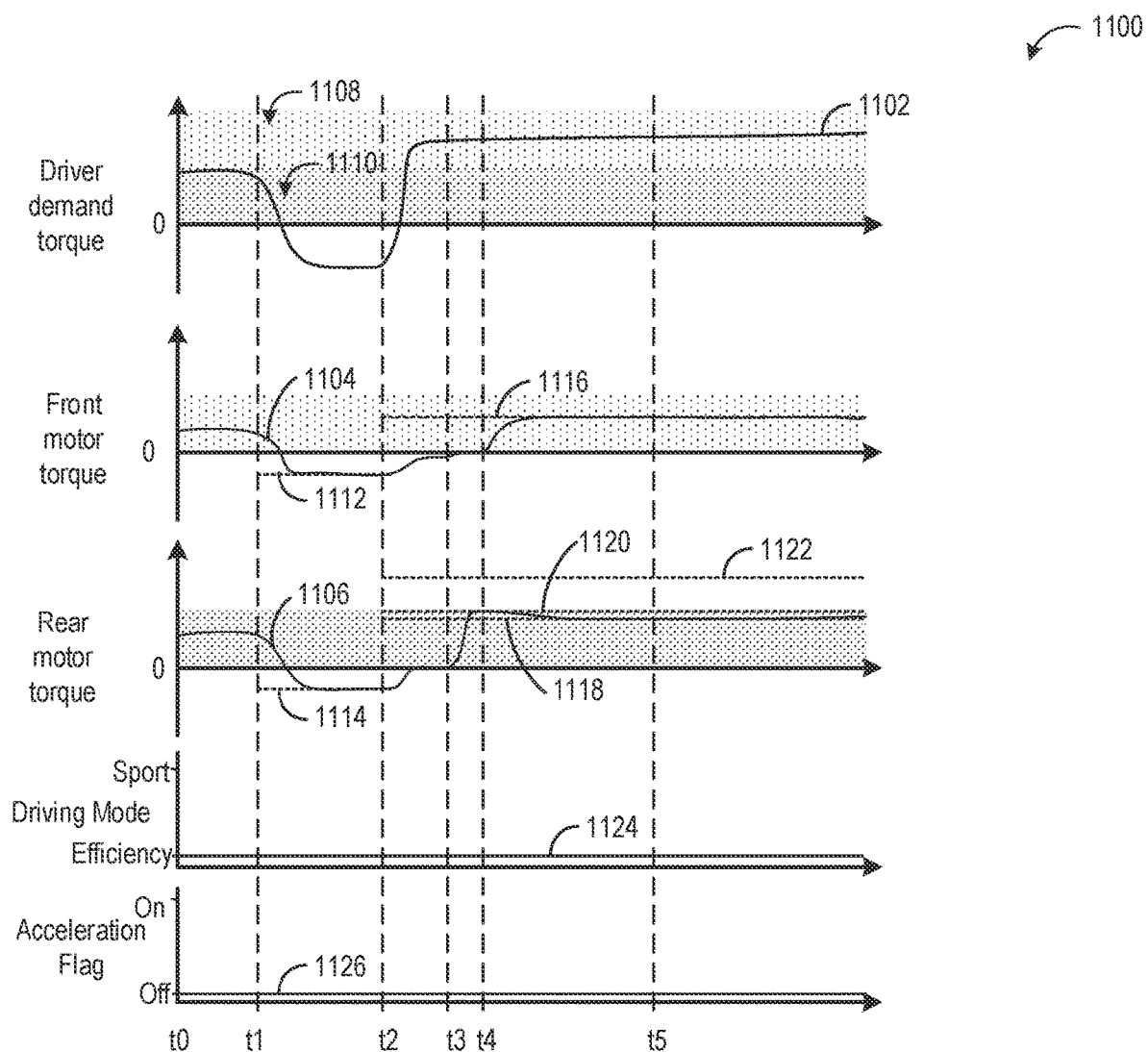
FIG. 11 is a timing diagram illustrating a fourth example prophetic operation of the coordinated torque shaping control system for clunk and shuffle management.
Figure 12:
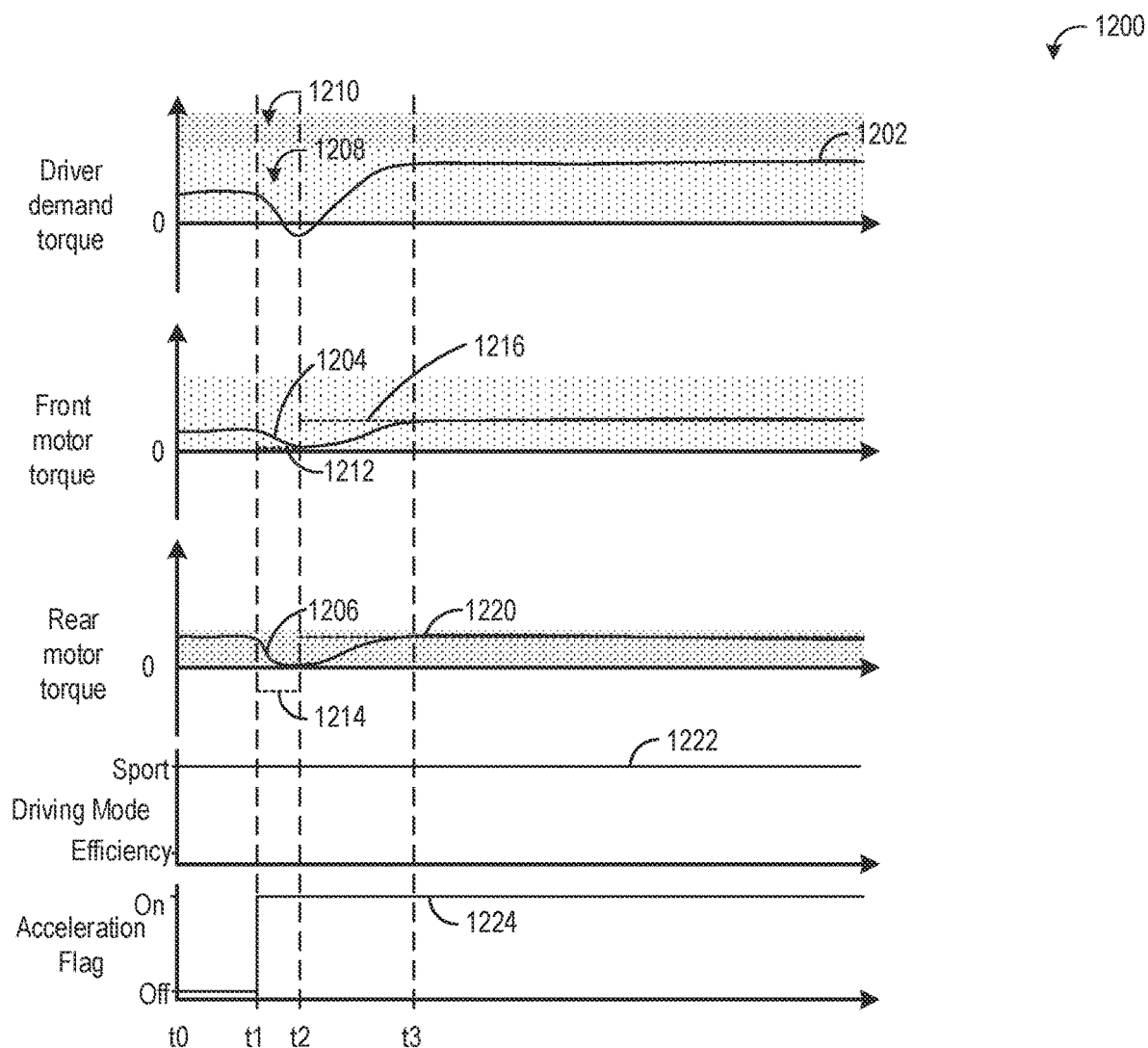
FIG. 12 is a timing diagram illustrating a fifth example prophetic operation of the coordinated torque shaping control system for clunk and shuffle management.
Figure 13:
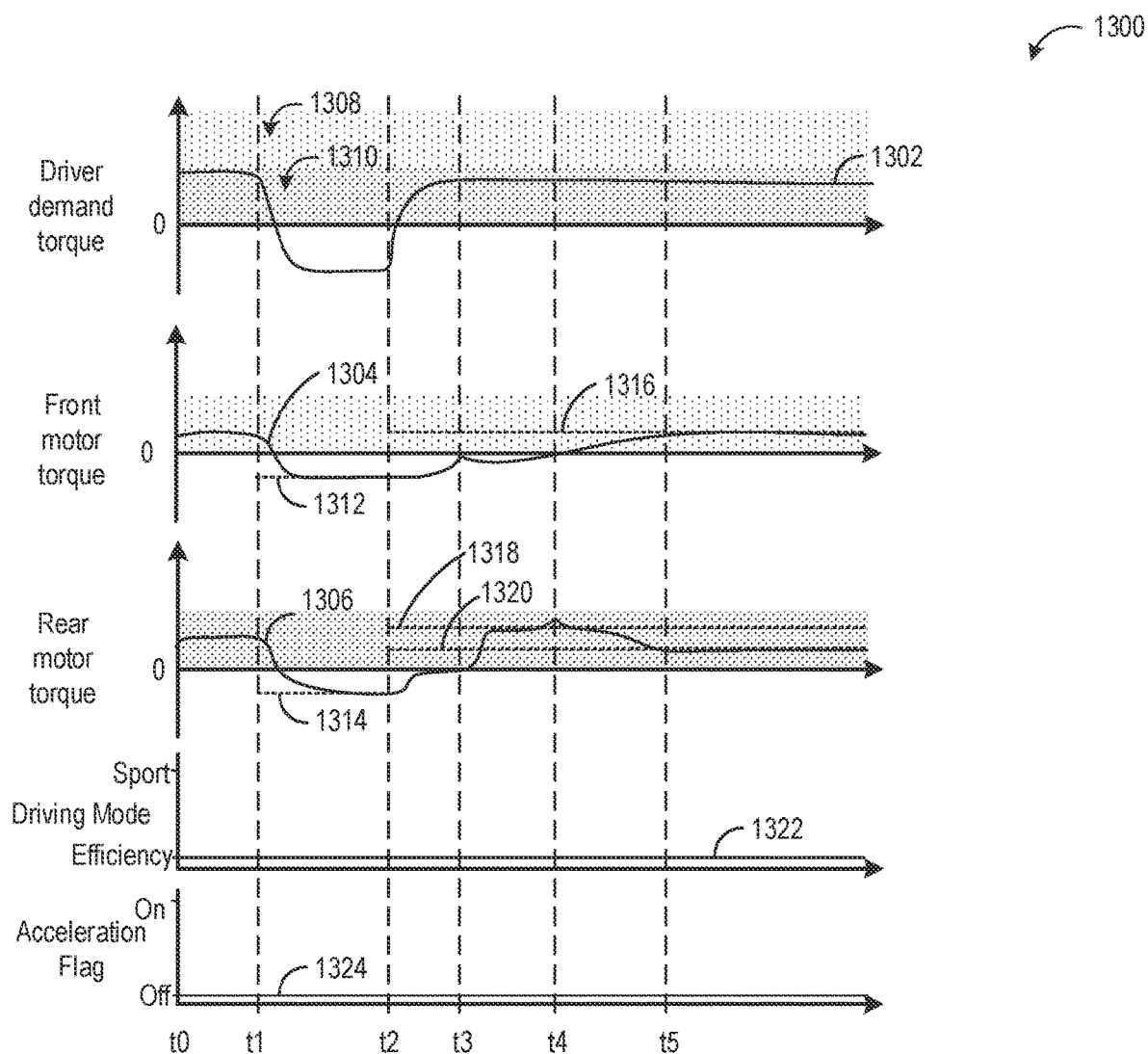
FIG. 13. is a timing diagram illustrating a sixth example prophetic operation of the coordinated torque shaping control system for clunk and shuffle management.

FIG. 8, FIG. 9, FIG. 10, FIG. 11, FIG. 12, and FIG. 13 are timing diagrams illustrating a sequence of actions performed within a control routine for shaping motor torque during a lash transition for an exemplary 2-P4 BEV drivetrain system. The control routine for motor torque shaping may be the same as or similar to the series of actions described above with reference to routines 300, 400, 500, 600, and 700 in FIGS. 3-7, respectively. The 2-P4 BEV drivetrain system may be the same or similar to drivetrain 100 shown in FIG. 1. Instructions for performing the control routines described in timing diagrams 800, 900, 1000, 1100, 1200, and 1300 may be executed by a controller (e.g., controller 12) based on instructions stored on a memory of the controller and in conjunction with sensory feedback received from components from the vehicle drivetrain system, including front and rear motor speed sensors, front and rear motor torque sensors, front and rear wheel speed sensors, and a pedal position sensor (e.g., sensors 16) described above with reference to FIG. 1. In the prophetic examples, the controller determines whether a tip-in or tip-out is indicated. If a tip-out is indicated, the motors of the front and rear axle (e.g., motors 102, 106 in FIG. 1) may be controlled to cross the zero torque threshold with reduced lash compensation and the negative torque demand distributed between the motors based on a driving mode (e.g., battery efficiency or sport). If a tip-in is indicated, the controller may execute a coordinated torque shaping strategy based the sign of the front and rear motor torque, driver torque demand, and an acceleration flag condition. FIG. 8, FIG. 9, and FIG. 12 depict scenarios illustrating coordinated torque shaping with the vehicle in sport mode. FIG. 10, FIG. 11 and FIG. 13 depict scenarios illustrating coordinated torque shaping with the vehicle in battery efficiency mode. The horizontal (x-axis) denotes time and the vertical markers t0-t3 identify relevant times in timing diagrams 800, 900, 1000, 1100, 1200, and 1300 of FIGS. 8, 9, 10, 11, 12, and 13 respectively, for coordinated motor torque shaping.

Timing diagram 800 of FIG. 8 shows plots 802, 804, 806, 808, and 810, which illustrate states of components and/or control settings of the drivetrain system over time. Plot 802 indicates a driver demand torque. Driver demand torque may be a shaped, e.g., rate-limited, and filtered driver demand in response to accelerator tip-in/out such as described in FIG. 2. Decreasing driver demand torque indicates a driver accelerator tip-out. Increasing driver demand torque indicates a driver accelerator tip-in. Driver demand background 808 indicates the maximum positive torque demand that may be distributed to the front motor. Driver demand background 810 indicates the maximum positive torque demand that may be distributed to the rear motor. In the example, the front motor can provide greater positive torque than the rear motor based on system specification. Driver demand may be distributed or allocated to the motor of the front axle and the motor of the rear axle based on a coordinated torque shaping strategy. Plot 804 indicates the front motor torque. Plot 806 indicates the rear motor torque. Driver demand torque, front motor torque, and rear motor torque may be positive or negative. Plot 822 indicates the driving mode with states "sport" and "efficiency" indicating battery efficiency mode. Plot 824 indicates an accelerator flag condition with states "on" and "off" The accelerator flag may be set to "on" in response to a tip-out when the drivetrain is operating in sport mode.

At t0, driver demand torque is positive as shown in plot 802. The torque demand is distributed between the front and rear motors as shown in plot 804 and 806, respectively. Front motor torque demand allocation is less than rear motor torque allocation. The drivetrain is controlled in sport mode and the acceleration flag is off. From t0 to t1, driver demand torque increases slightly, and correspondingly, allocation is increased to the front motor torque and the rear motor torque.

At t1, a tip-out is detected as shown by the reducing torque demand in plot 802. With the vehicle controlled in sport mode, the negative torque request is distributed between the front and rear motors to maintain positive torque at one motor while meeting the overall negative torque request. The motor of the front axle is designated to maintain positive torque based on the greater maximum available torque indicated by driver demand background 808. The total negative driver demand torque is split between positive torque threshold 812 for the front motor and negative torque threshold 814 for the rear motor. The ready to accelerate flag is set to "on."

From t1 to t2, the front motor torque in plot 804 is reduced to the positive torque threshold 812 and rear motor torque in plot 806 is reduced through the lash (e.g., zero torque) to negative torque threshold 814.

At t2, a tip-in is detected as shown by the increasing torque demand in plot 802. With the acceleration flag set to "on", the controller receives an indication that the drivetrain is ready for acceleration. Plot 802 is shown lower than the driver demand background 808 indicating the front motor is capable of providing the driver demand torque plus lash compensation for the rear motor lash transition. The torque the front motor will generate while the motor of the second axle crosses the zero torque point is indicated by lash torque threshold 816. The desired front-rear split is indicated by desired front torque threshold 818 and desired rear torque threshold 820. The rear motor threshold lash transition speed (e.g., target speed) is set at the first threshold speed represented by a duration from t3 to t4. The rear motor threshold lash speed is relatively slow due to the front motor being capable of providing the driver demand torque plus lash compensation and may generate minimal clunk.

From t2 to t3 the front motor torque is increased to lash torque threshold 816 while the rear motor torque is increases to hold at the lash zone boundary. In other words, the rear motor torque increases to near zero torque but does not cross the lash. At t3, the front motor torque reaches the lash torque threshold. In response, the rear motor transitions the lash at the threshold speed represented by a duration from t3 to t4. At t4, the rear motor crosses the zero torque point.

From t4 to t5, front motor torque is ramped down to the desired front torque threshold 818. Rear motor torque is ramped up to the desired rear torque threshold 820. The ramping is gentle. At t5, the desired front-rear torque distribution is achieved.

Timing diagram 900 of FIG. 9 illustrates a second prophetic example of a coordinated torque shaping strategy for a 2-P4 electric drivetrain. Timing diagram 900 shows plots 902, 904, 906, 908, and 910, which illustrate states of components and/or control settings of the drivetrain system over time. Plot 902 indicates a driver demand torque. Driver demand torque may be a shaped, e.g., rate-limited, and filtered driver demand in response to accelerator tip-in/out such as described in FIG. 2. Decreasing driver demand torque indicates an accelerator tip-out. Increasing driver demand torque indicates an accelerator tip-in. Driver demand background 908 indicates the maximum positive torque demand that may be distributed to the front motor. Driver demand background 910 indicates the maximum positive torque demand that may be distributed to the rear motor. In the example, the front motor can provide greater maximum torque than the rear motor based on system specifications. Driver demand may be distributed to the motor of the front axle and the motor of the rear axle based on a coordinated torque shaping strategy. Plot 904 indicates the front motor torque. Plot 906 indicates the rear motor torque. Driver demand torque, front motor torque, and rear motor torque may be positive or negative. Plot 924 indicates the driving mode with states "sport" and "efficiency" indicating battery efficiency mode. Plot 926 indicates an accelerator flag condition with states "on" and "off" The accelerator flag may be set to "on" in response to a tip-out with the drivetrain controlled in sport mode.

At t0, driver demand torque is positive as shown in plot 902. The torque demand is distributed between the front and rear motors as shown in plot 904 and 906, respectively. Front motor torque demand allocation is less than rear motor torque allocation. The drivetrain is controlled in sport mode and the acceleration flag is off. From t0 to t1, driver demand torque is steady At t1, a tip-out is detected as shown by the reducing torque demand in plot 902. With the vehicle controlled in sport mode, the negative torque request is distributed between the front and rear motors to maintain positive torque at one motor while meeting the overall negative torque request. The motor of the front axle is designated to maintain positive torque based on the greater maximum available torque indicated by driver demand background 908. The total negative driver demand torque is split between positive torque threshold 912 for the front motor and negative torque threshold 914 for the rear motor. The ready to accelerate flag is set to "on."

From t1 to t2, the front motor torque in plot 904 is reduced to the positive torque threshold 912 and rear motor torque in plot 906 is reduced through the lash (e.g., zero torque) to negative torque threshold 914.

At t2, a tip-in is detected as shown by the increasing torque demand in plot 902. With the acceleration flag set to "on", the controller receives an indication that the drivetrain is ready for acceleration. Threshold 922 indicates the driver demand plus lash torque threshold. Threshold 922 is higher than the front motor maximum available torque 916 indicating the front motor is not capable of providing the driver demand torque plus lash compensation for the rear motor lash transition. The front motor lash torque threshold is set to the front motor maximum available torque 916. The desired front-rear split is indicated by desired front torque threshold 918 and desired rear torque threshold 920. The rear motor threshold lash transition speed (e.g., target speed) is set at the second threshold speed represented by a duration from t3 to t4. The rear motor lash crossing speed is relatively quicker than the example in FIG. 8 due to the front motor and the second motor torque being necessary for the driver demand.

From t2 to t3 the front motor torque is increased to lash torque threshold while the rear motor torque is increases to hold at the lash zone boundary. In other words, the rear motor torque increases to near zero torque but does not cross the lash. At t3, the front motor torque reaches the lash torque threshold. In response, the rear motor transitions the lash at the threshold speed represented by a duration from t3 to t4. At t4, the rear motor crosses the zero torque point.

From t4 to t5, front motor torque is ramped down to the desired front torque threshold 918. Rear motor torque is ramped up to the desired rear torque threshold 920. At t5, the desired front-rear torque distribution is achieved.

Timing diagram 1000 of FIG. 10 illustrates a third prophetic example of coordinated torque shaping strategy for a 2-P4 BEV drivetrain. Timing diagram shows plots 1002, 1004, 1006, 1008, and 1010, which illustrate states of components and/or control settings of the drivetrain system over time. Plot 1002 indicates a driver demand torque. Driver demand torque may be a shaped, e.g., rate-limited, and filtered driver demand in response to accelerator tip-in/out such as described in FIG. 2 and FIG. 4. Decreasing driver demand torque indicates a driver accelerator tip-out. Increasing driver demand torque indicates a driver accelerator tip-in. Driver demand background 1008 indicates the maximum positive torque demand that may be distributed to the front motor. Driver demand background 1010 indicates the maximum positive torque demand that may be distributed to the rear motor. In the example, the rear motor and the front motor can provide equal amounts of positive torque based on system specifications. Driver demand may be distributed to the motor of the front axle and the motor of the rear axle based on a coordinated torque shaping strategy. Plot 1004 indicates the front motor torque. Plot 1006 indicates the rear motor torque. Driver demand torque, front motor torque, and rear motor torque may be positive or negative. Plot 1022 indicates the driving mode with states "sport" and "efficiency". Plot 1024 indicates an accelerator flag condition with states "on" and "off." The accelerator flag may be set to "on" in response to a tip-out when the drivetrain is operating in sport mode.

At t0, driver demand torque is positive as shown in plot 1002. The torque demand is distributed between the motors of front and rear axle as shown in plot 1004 and 1006, respectively. A greater allocation of driver demand torque is distributed to the motor of the rear axle than the front axle. The drivetrain is controlled in battery efficiency mode and the acceleration flag is off. From t0 to t1, driver demand torque and front-rear motor torque distribution is relatively steady.

At t1, a tip-out is detected as shown by the reducing torque demand in plot 1002. With the vehicle controlled in battery efficiency mode, the negative torque request is distributed between the motors of the front and rear axles such that both motors will provide negative torque. The total driver demand torque is split between negative torque threshold 1012 for the front motor and negative torque threshold 1014 for the rear motor. In the example, the negative torque demand is allocated equally between the motors of the front and rear axle.

From t1 to t2, the front motor torque in plot 1004 is reduced to negative torque threshold 1012. Rear motor torque in plot 1006 is reduced to negative torque threshold 1014.

At t2, a tip-in is detected as shown by the increasing torque demand in plot 1002. With the acceleration flag set to "off", the controller determines the coordinated torque shaping strategy for the front and rear motors to cross the lash. The front and rear motors are equally capable of providing driver demand torque plus lash compensation, therefore the first motor designation is based on other operating conditions. In the example, the passengers feel less torque disturbance when the rear axle traverses the lash and therefore the rear motor is designated the first motor. The rear motor lash transition speed (e.g., target speed) is set at a third threshold speed represented by a duration from t2 to t3. The torque the rear motor will generate while the front motor crosses the zero torque point is indicated by lash torque threshold 1018. The desired front-rear split is indicated by desired front torque threshold 1016 and desired rear torque threshold 1020. The front motor will transition after the rear motor reaches the lash torque threshold. The front motor will transition the lash at the first threshold speed represented by duration t3 to t4. The front motor threshold lash speed is relatively slow due to the rear motor being capable of providing the driver demand torque plus lash compensation and may generate minimal clunk.

From t2 to t3 the rear motor torque gently transitions the axle lash at the threshold speed shown in plot 1006. Also from t2 to t3, in plot 1004, the front motor torque is increased and held at the lash zone boundary. At t3, the rear motor crosses zero torque. Rear motor torque is increased to lash torque threshold 1018 while the front motor transitions the axle lash at the threshold speed represented by a duration from t3 to t4. At t4, the front motor crosses the zero torque point.

From t4 to t5, rear motor torque is ramped down to the desired rear torque threshold 1020. Front motor torque is ramped up to the desired front torque threshold 1016. At t5, the desired front-rear torque distribution is achieved.

Timing diagram 1100 of FIG. 11 illustrates a fourth prophetic example of coordinated torque shaping strategy for a 2-P4 BEV drivetrain. Timing diagram shows plots 1102, 1104, 1106, 1108, and 1110, which illustrate states of components and/or control settings of the drivetrain system over time. Plot 1102 indicates a driver demand torque. Driver demand torque may be a shaped, e.g., rate-limited, and filtered driver demand in response to accelerator tip-in/out such as described in FIG. 2 and FIG. 4. Decreasing driver demand torque indicates a driver accelerator tip-out. Increasing driver demand torque indicates a driver accelerator tip-in. Driver demand background 1108 indicates the maximum positive torque demand that may be distributed to the front motor. Driver demand background 1110 indicates the maximum positive torque demand that may be distributed to the rear motor. In the example, the rear motor and the front motor can provide equal amounts of positive torque based on system specifications. Driver demand may be distributed to the motor of the front axle and the motor of the rear axle based on a coordinated torque shaping strategy. Plot 1104 indicates the front motor torque. Plot 1106 indicates the rear motor torque. Driver demand torque, front motor torque, and rear motor torque may be positive or negative. Plot 1124 indicates the driving mode with states "sport" and "efficiency". Plot 1126 indicates an accelerator flag condition with states "on" and "off" The accelerator flag may be set to "on" in response to a tip-out when the drivetrain is operating in sport mode.

At t0, driver demand torque is positive as shown in plot 1102. The torque demand is distributed between the motors of front and rear axle as shown in plot 1104 and 1106, respectively. A greater allocation of driver demand torque is distributed to the motor of the rear axle than the front axle. The drivetrain is controlled in battery efficiency mode and the acceleration flag is off. From t0 to t1, driver demand torque and front-rear motor torque distribution is relatively steady.

At t1, a tip-out is detected as shown by the reducing torque demand in plot 1102. With the vehicle controlled in battery efficiency mode, the negative torque request is distributed between the motors of the front and rear axles such that both motors will provide negative torque. The total driver demand torque is split between negative torque threshold 1112 for the front motor and negative torque threshold 1114 for the rear motor. In the example, the negative torque demand is allocated equally between the motors of the front and rear axle.

From t1 to t2, the front motor torque in plot 1104 is reduced to negative torque threshold 1112. Rear motor torque in plot 1106 is reduced to negative torque threshold 1114.

At t2, a tip-in is detected as shown by the increasing torque demand in plot 1102. With the acceleration flag set to "off", the controller determines the coordinated torque shaping strategy for the front and rear motors to cross the lash. Neither motor alone has the torque capacity to provide the driver demand plus lash compensation, therefore first motor designation is based on other operating conditions. In the example, the rear motor is at a cooler temperature and is designated the first motor. Threshold 1122 is higher than the rear motor torque maximum available 1120 indicating the rear motor is not capable of providing the driver demand torque plus lash compensation for the front motor lash transition. The rear motor lash torque threshold is set to the rear motor torque maximum available 1120. The desired front-rear split is indicated by desired front torque threshold 1116 and desired rear torque threshold 1118. The rear motor threshold lash transition speed (e.g., target speed) is set at the third threshold speed represented by a duration from t2 to t3. The front motor will transition after the rear motor reaches the lash torque threshold. The front motor will transition the lash at the second threshold speed represented by duration t3 to t4. The front motor threshold lash speed is relatively fast (e.g., more urgent) due to the rear motor being capable of providing the driver demand torque plus lash compensation and may generate minimal clunk.

From t2 to t3 the rear motor torque gently transitions the lash at the threshold speed shown in plot 1106. Also from t2 to t3, plot 1104 shows the front motor torque is increased and held at the lash zone boundary. At t3, the rear motor crosses zero torque. Rear motor torque is increased to lash torque threshold while the front motor transitions the axle lash at the threshold speed represented by a duration from t3 to t4. At t4, the front motor crosses the zero torque point.

From t4 to t5, rear motor torque is ramped down to the desired rear torque threshold 1118. Front motor torque is ramped up to the desired front torque threshold 1116. At t5, the desired front-rear torque distribution is achieved.

Timing diagram 1100 of FIG. 11 illustrates a fifth prophetic example of coordinated torque shaping strategy for a 2-P4 BEV drivetrain. Timing diagram 1200 of FIG. 12 shows plots 1202, 1204, 1206, 1208, and 1210, which illustrate states of components and/or control settings of the drivetrain system over time. Plot 1202 indicates a driver demand torque. Driver demand torque may be a shaped, e.g., rate-limited, and filtered driver demand in response to accelerator tip-in/out such as described in FIG. 2. Decreasing driver demand torque indicates a driver accelerator tip-out. Increasing driver demand torque indicates a driver accelerator tip-in. Driver demand background 1208 indicates the maximum positive torque demand that may be distributed to the front motor. Driver demand background 1210 indicates the maximum positive torque demand that may be distributed to the rear motor. In the example, the front motor can provide greater positive torque than the rear motor based on system specification. Driver demand may be distributed or allocated to the motor of the front axle and the motor of the rear axle based on a coordinated torque shaping strategy. Plot 1204 indicates the front motor torque. Plot 1206 indicates the rear motor torque. Driver demand torque, front motor torque, and rear motor torque may be positive or negative. Plot 1222 indicates the driving mode with states "sport" and "efficiency". Plot 1224 indicates an accelerator flag condition with states "on" and "off." The accelerator flag may be set to "on" in response to a tip-out when the drivetrain is operating in sport mode.

At t0, driver demand torque is positive as shown in plot 1202. The torque demand is distributed between the front and rear motors as shown in plot 1204 and 1206, respectively. Front motor torque demand allocation is less than rear motor torque allocation. The drivetrain is controlled in sport mode and the acceleration flag is off. From t0 to t1, driver demand torque and front-rear allocation is relatively steady.

At t1, a tip-out is detected as shown by the reducing torque demand in plot 1202. With the vehicle controlled in sport mode, the negative torque request is distributed between the front and rear motors to maintain positive torque at one motor while meeting the overall negative torque request. The motor of the front axle is designated to maintain positive torque based on the greater maximum available torque indicated by driver demand background 1208. The total negative driver demand torque is split between positive torque threshold 1212 for the front motor and negative threshold 1214 for the rear motor. The ready to accelerate flag is set to "on."

From t1 to t2, the front motor torque in plot 1204 is reduced in the direction of the positive torque threshold 1212 and rear motor torque in plot 1206 is reduced in the direction of the negative torque threshold 814.

At t2, a tip-in is detected as shown by the increasing torque demand in plot 1202. The tip-in interrupts torque reducing before the rear motor torque crosses the zero torque point. The front motor torque and the rear motor torque are both positive. Thus, the driver demanded torque will be allocated to the front and without coordinated torque shaping (e.g., no lash to cross). The desired front-rear split is indicated by desired front torque threshold 1216 and desired rear torque threshold 1220.

From t2 to t3, the front and rear motor torques ramp to the desired front-rear split. At t4, the driver demand torque met by the front and rear motors.

In this way, by controlling the drivetrain in the sport mode, positive torque may be provided immediately upon accelerator tip-in and with substantially reduced clunk. The positive torque designated motor may ramp to the commanded torque while the other motor crosses the lash gently. By controlling the drivetrain in battery efficiency mode, negative torque may be distributed between the motors of the front and rear axle during a tip-out, conserving charge. During a tip-in, the motor of the front or rear may be selected to cross the lash first and provide compensatory torque to the second axle lash crossing based on priorities such as motor capacity, vehicle handling, or other operating conditions. In one example, depending on the magnitude of the torque demand, front and rear torque may ramp to the commanded torque more or less urgently.

Timing diagram 1300 of FIG. 13 illustrates a sixth prophetic example of coordinated torque shaping strategy for a 2-P4 BEV drivetrain. Timing diagram 1300 illustrates a scenario during a tip-in where the motor of the axle designated to cross the lash second may provide a brief torque increase without crossing the lash to provide compensatory torque to support the first axle lash crossing. After the first axle traverses the lash, the second motor torque slows to gently bring the second axle through the lash while the first motor torque increases to compensate for the second axle lash. Timing diagram shows plots 1302, 1304, 1306, 1308, and 1310, which illustrate states of components and/or control settings of the drivetrain system over time. Plot 1302 indicates a driver demand torque. Driver demand torque may be a shaped, e.g., rate-limited, and filtered driver demand in response to accelerator tip-in/out such as described in FIG. 2 and FIG. 4. Decreasing driver demand torque indicates a driver accelerator tip-out. Increasing driver demand torque indicates a driver accelerator tip-in. Driver demand background 1308 indicates the maximum positive torque demand that may be distributed to the front motor. Driver demand background 1310 indicates the maximum positive torque demand that may be distributed to the rear motor. In the example, the rear motor and the front motor can provide equal amounts of positive torque based on system specifications. Driver demand may be distributed to the motor of the front axle and the motor of the rear axle based on a coordinated torque shaping strategy. Plot 1304 indicates the front motor torque. Plot 1306 indicates the rear motor torque. Driver demand torque, front motor torque, and rear motor torque may be positive or negative. Plot 1322 indicates the driving mode with states "sport" and "efficiency". Plot 1324 indicates an accelerator flag condition with states "on" and "off." The accelerator flag may be set to "on" in response to a tip-out when the drivetrain is operating in sport mode.

At t0, driver demand torque is positive as shown in plot 1302. The torque demand is distributed between the motors of front and rear axle as shown in plot 1304 and 1306, respectively. A greater allocation of driver demand torque is distributed to the motor of the rear axle than the front axle. The drivetrain is controlled in battery efficiency mode and the acceleration flag is off. From t0 to t1, driver demand torque and front-rear motor torque distribution is relatively steady.

At t1, a tip-out is detected as shown by the reducing torque demand in plot 1002. With the vehicle controlled in battery efficiency mode, the negative torque request is distributed between the motors of the front and rear axles such that both motors will provide negative torque. The total driver demand torque is split between negative torque threshold 1312 for the front motor and negative torque threshold 1314 for the rear motor. In the example, the negative torque demand is allocated equally between the motors of the front and rear axle.

From t1 to t2, the front motor torque in plot 1304 is reduced to negative torque threshold 1312. Rear motor torque in plot 1306 is reduced to negative torque threshold 1014.

At t2, a tip-in is detected as shown by the increasing torque demand in plot 1302. With the acceleration flag set to "off", the controller determines the coordinated torque shaping strategy for the front and rear motors to cross the lash. The front and rear motors are equally capable of providing driver demand torque plus lash compensation, therefore the first motor designation is based on other operating conditions. In the example, the passengers feel less torque disturbance when the rear axle traverses the lash and therefore the rear motor is designated the first motor. The rear motor lash transition speed (e.g., target speed) is set at a third threshold speed represented by a duration from t2 to t3. The torque the rear motor will ramp towards while the front motor ramps to the zero torque point is indicated by lash torque threshold 1318. The desired front-rear split is indicated by desired front torque threshold 1316 and desired rear torque threshold 1320. The front motor will transition after the rear motor reaches the lash torque threshold. The front motor will transition the lash at the first threshold speed represented by duration t3 to t4. The front motor threshold lash speed is relatively slow due to the rear motor being capable of providing the driver demand torque plus lash compensation and may generate minimal clunk.

From t2 to t3, in plot 1306, the rear motor torque increases gently to transition the axle lash at the threshold speed. Also from t2 to t3, in plot 1304, the front motor torque is relatively steady until increasing to just below the zero torque to provide a brief increase in acceleration without lash to compensate the rear motor lash. At t3, the rear motor crosses zero torque. Rear motor torque is increased to lash torque threshold 1318 while the front motor torque is increased to transition the axle lash at the threshold speed represented by a duration from t3 to t4. Just before the front motor crosses the lash, the rear motor torque increases briefly to provide additional acceleration to offset the torque disturbance at t4 when the front motor crosses the zero torque point.

From t4 to t5, rear motor torque is ramped down to the desired rear torque threshold 1320. Front motor torque is ramped up to the desired front torque threshold 1316. At t5, the desired front-rear torque distribution is achieved.

FIG. 14 is an illustration 1400 of proposed system behavior during a tip-in. FIG. 14 includes wheel torque plot 1402, rear motor torque plot 1404, front motor torque plot 1406, rear wheels propulsive torque plot 1408, and front wheels propulsive torque plot 1410. Wheel torque plot 1402 shows a driver demand 1412. Upon tip-tip, wheel torque is shaped by the shaped wheel torque command 1416 and total propulsive wheel torque 1414. After crossing zero torque, shaped wheel torque command increases to meet driver demand.

The driver demand shown in wheel torque plot 1402 is distributed between the rear motor torque and the front motor torque. Rear motor torque plot 1404 shows an allocation of driver demand 1418, shaped rear motor torque 1424, rear motor torque 1420, and shaping 1422 through the zero torque point. Front motor torque plot 1406 shows an allocation of driver demand 1426, shaped front motor torque 1432, front motor torque 1428, and shaping 1430 through the zero torque point. In the example plot 1404, shaped rear motor torque 1424 traverse the zero torque point with shaping 1422, after which shaped rear motor torque 1424 increases to the allocation of driver demand 1418. Rear motor torque 1420 (e.g., actual) tracks the shaped rear motor torque 1424 (e.g., target). In sequence after the rear motor torque lash traverse, front motor torque plot 1406 shows front motor torque traverse the zero torque point with shaping 1430, after which shaped front motor torque 1432 increases to the allocation of driver demand 1426. Front motor torque 1428 (e.g., actual) tracks the shaped front motor torque 1432 (e.g., target). Rear wheels propulsive torque plot 1408 shows an allocation of driver demand 1434 and total rear wheels propulsive torque 1436. Front wheels propulsive torque plot 1410 shows an allocation of driver demand 1438 and total rear wheels propulsive torque 1440. Total propulsive torque is equal to the sum of the total rear wheels propulsive torque and the front wheels propulsive torque.

FIG. 15 is an illustration 1500 of proposed system behavior. Illustration 1500 includes plot 1501 of first motor (mtr1) torque, plot 1503 of second motor (mr2) torque, and plot 1505 of the shaft speed delta and target speeds for the first motor and the second motor. In the example, the estimated lash sizes are 60 degrees at the rear axle and 130 degrees at the front axle. The x-axis depicts time.

Plot 1501 and plot 1503 include unshaped driver demand trace 1502. The unshaped driver demand is distributed between the first motor and the second motor as first motor shaped command 1504 and second motor shaped command 1514, respectively. Arrow 1508 indicates first motor shaped command 1504 overshooting the unshaped driver demand trace 1502 for compensating the second motor lash transition. Arrow 1518 indicates first motor shaped command 1504 is executed in sequence prior to the execution of the second motor shaped command 1514. Arrow 1510 indicates non-monotonic shaping in the lash. Estimated first motor torque 1506 and estimated second motor torque 1516, including damping torque, are shown tracking the target first and second motor shaped commands. Plot 1505 shows in-lash speed target tracking for the first motor and second motor. The first motor transitions the lash at 1522. Shortly thereafter, the second motor transitions the lash at 1520.

In this way, the systems and methods described herein operate a coordinated and distributed control strategy for shaping front and rear motor torques to manage torque disturbances arising out of varying amounts of lash and compliance distributed across front and rear axles of a multi-motor, multi-axle drivetrain such as 2-P4 or power-split with EFAD/ERAD configurations. By commanding the front and rear axles to enter and exit their respective lash elements sequentially when sign of the demanded torque reverses (e.g., negative to positive or vice versa), compensating for one axle lash using the other axle motor, and regulating speed of a lash crossing for each axle, clunk and shuffle may be substantially reduced. The control strategy may include estimating individually the states of the lash of each axle (e.g., pre-lash, in-lash, post-lash) using the motor torques, motor speeds and wheel speeds. The strategy may include in response to driver tip-ins and tip-outs computing a shaped wheel torque demand taking into account shuffle frequencies of the front and rear axles, tip-in/tip-out flags, and the urgency of the driver. In one example, during tip-ins and tip-outs involving a lash, a first and second axle may be controlled to enter and exit their respective lash elements sequentially. The first motor of the first axle to cross the lash may compensate the second axle during the lash crossing. In one example, lash compensation may include increasing a ramp-rate and driver demand allocation to the compensating motor. In one example, the axle that is allocated a larger portion of the driver demand may be selected to enter and exit the lash first. In other examples, motor torque capacity or conditions may be influence the axle lash crossing sequence. In one example, the coordination between the front and rear axles may be accomplished via communication of the lash states, the shaped torque commands, tip-in flags, tip-out flags, and separate motor control modules or, alternatively, coordination could be carried out using a single control module. During axle crossing, the motor may track a target speed using a feedback controller. Shuffle maybe further mitigated by applying damping torque to the motor that may be computed using a feedback controller with inputs including motor speed, wheel speed, and driveline parameters (e.g., shaft stiffness, motor inertia, etc.). In one example, during a tip-out involving a lash, the first motor may be controlled generate positive torque and the first axle may be controlled to not cross the lash; the second motor may be controlled to generate negative torque and the second axle controlled to cross the lash, the sum of the first and second motor torques equaling to total negative torque demand. Upon tip-in, the first motor may provide immediate positive torque without lash while the second axle traverses the lash. The technical effect for a coordinated torque shaping system for clunk and shuffle management in a multi-motor, multi-axle drivetrain is increased drivability and reduced torsional wear on the drivetrain.

The disclosure also provides support for a drivetrain system comprising: a first prime mover for supplying a torque to a front axle, a second prime mover for supplying a torque to a rear axle, and a controller configured to, in response to a torque reversal, command the front axle and the rear axle to cross lash zones sequentially. In a first example of the system, the controller is further configured to adjust one of the first prime mover and the second prime mover to overshoot a torque command for a controlled duration to compensate for a lash crossing. In a second example of the system, optionally including the first example, the response to the torque reversal includes compensating for one axle lash using the prime mover of the other axle. In a third example of the system, optionally including one or both of the first and second examples, the front axle, and the rear axle are separate. In a fourth example of the system, optionally including one or more or each of the first through third examples, during a first condition the front axle crosses a lash zone first and during a second condition the rear axle crosses the lash zone first. In a fifth example of the system, optionally including one or more or each of the first through fourth examples, the torque reversal is from negative torque to positive torque with regard to a direction of forward travel of a vehicle where forward is defined by the direction a driver is facing when seated in a driver seat. In a sixth example of the system, optionally including one or more or each of the first through fifth examples, a rate of change of torque of an axle transitioning first through the lash zone is greater than the rate of change of torque of the axle transitioning second through the lash zone. In a seventh example of the system, optionally including one or more or each of the first through sixth examples, a torque distribution ratio of the front axle to the rear axle is adjusted differently during lash transition as compared to the torque distribution ratio before and/or after the lash transition. In an eighth example of the system, optionally including one or more or each of the first through seventh examples, the response to the torque reversal includes adjusting the axle transitioning second through the lash zone based on torque limits of the prime mover of the axle transitioning first through the lash zone. In a ninth example of the system, optionally including one or more or each of the first through eighth examples, the response to the torque reversal includes increasing the torque to the prime mover compensating for the lash transition of the other axle for a duration. In a tenth example of the system, optionally including one or more or each of the first through ninth examples, a first controller controls a speed of lash transition for the front axle and a second controller controls the speed of lash transition for the rear axle.

The disclosure also provides support for a method for a drivetrain system having a first prime mover for supplying a torque to a front axle and a second prime mover for supplying a torque to a rear axle, comprising: during a first driving mode and a tip-out condition, controlling one of the first prime mover or the second prime mover to provide negative torque and the other of the first prime mover or the second prime mover to provide positive torque, the sum of the negative torque and positive torque equal to a total driver demand torque. In a first example of the method, the method further comprises: responsive to a tip-in, providing a faster torque response from the prime mover already providing positive torque. In a second example of the method, optionally including the first example, the method further comprises: transitioning the prime mover providing negative torque to providing positive torque through a lash region after providing the faster torque response from the prime mover already providing positive torque. In a third example of the method, optionally including one or both of the first and second examples, the first driving mode is a sport mode.

The disclosure also provides support for a method for a drivetrain system having a first prime mover for supplying a torque to a front axle and a second prime mover for supplying a torque to a rear axle, comprising: during a first driving mode and a tip-out condition, controlling one of the first prime mover or the second prime mover to provide negative torque and the other of the first prime mover or the second prime mover to provide positive torque, the sum of the negative torque and positive torque equal to a total driver demand torque, and, during a second driving mode and the tip-out condition, controlling the first prime mover to provide a first negative torque and the second prime mover to provide a second negative torque, the sum of the first negative torque and the second negative torque equal to the total driver demand torque, and selecting one of the front axle or the rear axle to transition a lash first based on a torque capacity of the first prime mover, the torque capacity of the second prime mover, and driver tip-in magnitude. In a first example of the method, the first driving mode is a sport mode and the second driving mode is an economy mode. In a second example of the method, optionally including the first example, the front axle and the rear axle are independent of one another. In a third example of the method, optionally including one or both of the first and second examples, during transition through the lash of the selected one of the front axle and rear axle, the prime mover of the selected axle is adjusted to overshoot a torque command for a controlled duration to compensate for the lash transition. In a fourth example of the method, optionally including one or more or each of the first through third examples, the first prime mover is a first motor, the first motor coupled in the first axle with a first gear train, and the second prime mover is a second motor, the second motor coupled in the second axle with a second gear train.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drivetrain system, comprising:
a first electric motor for supplying a torque to a front axle;
a second electric motor for supplying a torque to a rear axle; and
a controller configured to, in response to a torque reversal, command the front axle and the rear axle to cross lash zones sequentially,
wherein the front axle and the rear axle are independent of one another, and the first electric motor is drivingly coupled only to the front axle and the second electric motor is drivingly coupled only to the rear axle.

2. The drivetrain system of claim 1, wherein the controller is further configured to adjust one of the first electric motor and the second electric motor to overshoot a torque command for a controlled duration to compensate for a lash crossing, and wherein the first electric motor and the second electric motor have independently controlled torque, power, and speed.

3. The drivetrain system of claim 1, wherein the response to the torque reversal includes compensating for a lash of the front axle using the second electric motor and compensating for a lash of the rear axle using the first electric motor.

4. The drivetrain system of claim 3, wherein the front axle and the rear axle are separate.

5. The drivetrain system of claim 4, wherein during a first condition the front axle crosses a lash zone first and during a second condition the rear axle crosses the lash zone first.

6. The drivetrain system of claim 5, wherein the torque reversal is from negative torque to positive torque with regard to a direction of forward travel of a vehicle where forward is defined by the direction a driver is facing when seated in a driver seat.

7. The drivetrain system of claim 6, wherein a rate of change of torque of an axle transitioning first through the lash zone is greater than the rate of change of torque of the axle transitioning second through the lash zone.

8. The drivetrain system of claim 7, wherein a torque distribution ratio of the front axle to the rear axle is adjusted differently during lash transition as compared to the torque distribution ratio before and/or after the lash transition.

9. The drivetrain system of claim 8, wherein the response to the torque reversal includes adjusting the axle transitioning second through the lash zone based on torque limits of the electric motor of the axle transitioning first through the lash zone.

10. The drivetrain system of claim 9, wherein the response to the torque reversal includes increasing the torque to the first electric motor compensating for a lash transition of the rear axle for a duration or increasing the torque to the second electric motor compensating for the lash transition of the front axle for a duration.

11. The drivetrain system of claim 10, wherein the first controller controls a speed of lash transition for the front axle using feedback control from one or more sensors of the first electric motor and a second controller controls the speed of lash transition for the rear axle using feedback control from one or more sensors of the second electric motor.

12. A method for a drivetrain system having a first electric motor for supplying a torque to a front axle and a second electric motor for supplying a torque to a rear axle, comprising:
during a first driving mode and a tip-out condition,
controlling the first electric motor to provide positive torque and the second electric motor to provide negative torque, the sum of the negative torque and the positive torque electronically controlled to be equal to a total driver demand torque, wherein the front axle and the rear axle are independent of one another.

13. The method of claim 12, further comprising, responsive to a tip-in, providing a faster torque response from the electric motor already providing positive torque.

14. The method of claim 13, further comprising transitioning the electric motor providing negative torque to providing positive torque through a lash region after providing the faster torque response from the electric motor already providing positive torque.

15. The method of claim 14, wherein the first driving mode is a sport mode.

16. A method for a drivetrain system having a first electric motor for supplying a torque to a front axle and a second electric motor for supplying a torque to a rear axle, comprising:
- during a first driving mode and a tip-out condition, electronically controlling the first electric motor to provide negative torque and the second electric motor to provide positive torque, the sum of the negative torque and the positive torque equal to a total driver demand torque; and
- during a second driving mode and the tip-out condition, controlling the first electric motor to provide a first negative torque and the second electric motor to provide a second negative torque, the sum of the first negative torque and the second negative torque equal to the total driver demand torque; and
- selecting one of the front axle or the rear axle to transition a lash first based on a torque capacity of the first electric motor, the torque capacity of the second electric motor, and a driver tip-in magnitude.

17. The method of claim 16, wherein the first driving mode is a sport mode and the second driving mode is an economy mode.

18. The method of claim 17, wherein the front axle and the rear axle are independent of one another.

19. The method of claim 18, wherein during transition through the lash of the selected one of the front axle and the rear axle, the electric motor of the selected axle is adjusted to overshoot a torque command for a controlled duration to compensate for the lash transition.

20. The method of claim 19, wherein the first electric motor and the second electric motor have independently controlled torque, power, and speed.

* * * * *